US012663087B2

(12) United States Patent
Jimenez et al.

(10) Patent No.: US 12,663,087 B2
(45) Date of Patent: Jun. 23, 2026

(54) SYSTEMS AND METHODS FOR PURGING AN ISOLATION VALVE WITH A LIQUID PURGE MEDIUM

(71) Applicant: TapcoEnpro, LLC, Channelview, TX (US)

(72) Inventors: Filiberto Jimenez, Channelview, TX (US); Kenneth Krause, Sandy, UT (US)

(73) Assignee: TapcoEnpro LLC, Channelview, TX (US)

( * ) Notice: Subject to any disclaimer, the term of this patent is extended or adjusted under 35 U.S.C. 154(b) by 194 days.

(21) Appl. No.: 18/395,692

(22) Filed: Dec. 25, 2023

(65) Prior Publication Data

US 2025/0020221 A1     Jan. 16, 2025

Related U.S. Application Data

(62) Division of application No. 17/139,366, filed on Dec. 31, 2020, now Pat. No. 11,852,258.

(51) Int. Cl.
| | | |
|---|---|---|
| *C10G 7/12* | (2006.01) | |
| *B01D 3/14* | (2006.01) | |
| *B01D 3/42* | (2006.01) | |
| *B08B 9/032* | (2006.01) | |
| *C10G 55/06* | (2006.01) | |
| *F16K 3/20* | (2006.01) | |
| *F16K 3/02* | (2006.01) | |

(52) U.S. Cl.
CPC ................ *F16K 3/207* (2013.01); *B01D 3/14* (2013.01); *B01D 3/4283* (2013.01); *B08B 9/0321* (2013.01); *C10G 7/12* (2013.01); *C10G 55/06* (2013.01); *B08B 2209/032* (2013.01); *F16K 3/0281* (2013.01)

(58) Field of Classification Search
CPC .................................................. C10G 7/00–12
See application file for complete search history.

(56) References Cited

U.S. PATENT DOCUMENTS

| | | | |
|---|---|---|---|
| 8,459,608 B2 * | 6/2013 | Lah | F16K 3/0236 |
| | | | 251/328 |
| 2011/0214748 A1 * | 9/2011 | Sebben | B08B 3/04 |
| | | | 251/304 |

* cited by examiner

*Primary Examiner* — Renee Robinson
(74) *Attorney, Agent, or Firm* — Dax D. Anderson; Kirton McConkie

(57) ABSTRACT

A system and method for purging a bottom slurry circuit isolation valve using hydrocarbons.

8 Claims, 16 Drawing Sheets

SYSTEMS AND METHODS FOR PURGING AN ISOLATION VALVE WITH A LIQUID PURGE MEDIUM

CROSS-REFERENCE TO RELATED APPLICATIONS

This application is a divisional application claiming priority to U.S. patent application Ser. No. 17/139,366 filed on Dec. 31, 2020.

TECHNICAL FIELD

The present disclosure relates generally to the purging of isolation valves. More particularly, the disclosure relates to using hydrocarbons distilled in a fractionation tower as a liquid purge media in isolation valves.

BACKGROUND

Isolation valves control the flow of potentially destructive process fluids. To prevent fluids from leaving the line and entering the valve body or bonnets, a purge media under a positive pressure ensures the process fluid does not leave the line. Gasses such as steam and nitrogen are often used as the purge media. However, purging with gas changes the density of the process fluids and can lead to cavitation in slurry pumps.

BRIEF SUMMARY

The general purpose of the systems and methods disclosed herein is to improve isolation valve purging. Specifically, in some embodiments where multiple distillation columns or fractionators and slurry pump systems are present in a refinery, each fractionator has circuits isolated by an isolation valve. The present invention comprises an isolation valve purge system for an isolation valve, with internal components configured to isolate the flow of process fluid through the bottom slurry circuit line. In some embodiments the isolation valve is purged using a liquid purge medium created in the fractionation tower, such as a hydrocarbons, oils of different viscosity or a combination of hydrocarbons.

Some embodiments comprise a method for reducing cavitation in a pressurized line. Some embodiments comprise purging an isolation valve controlling a line with process fluid flowing therethrough with a liquid purge medium.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
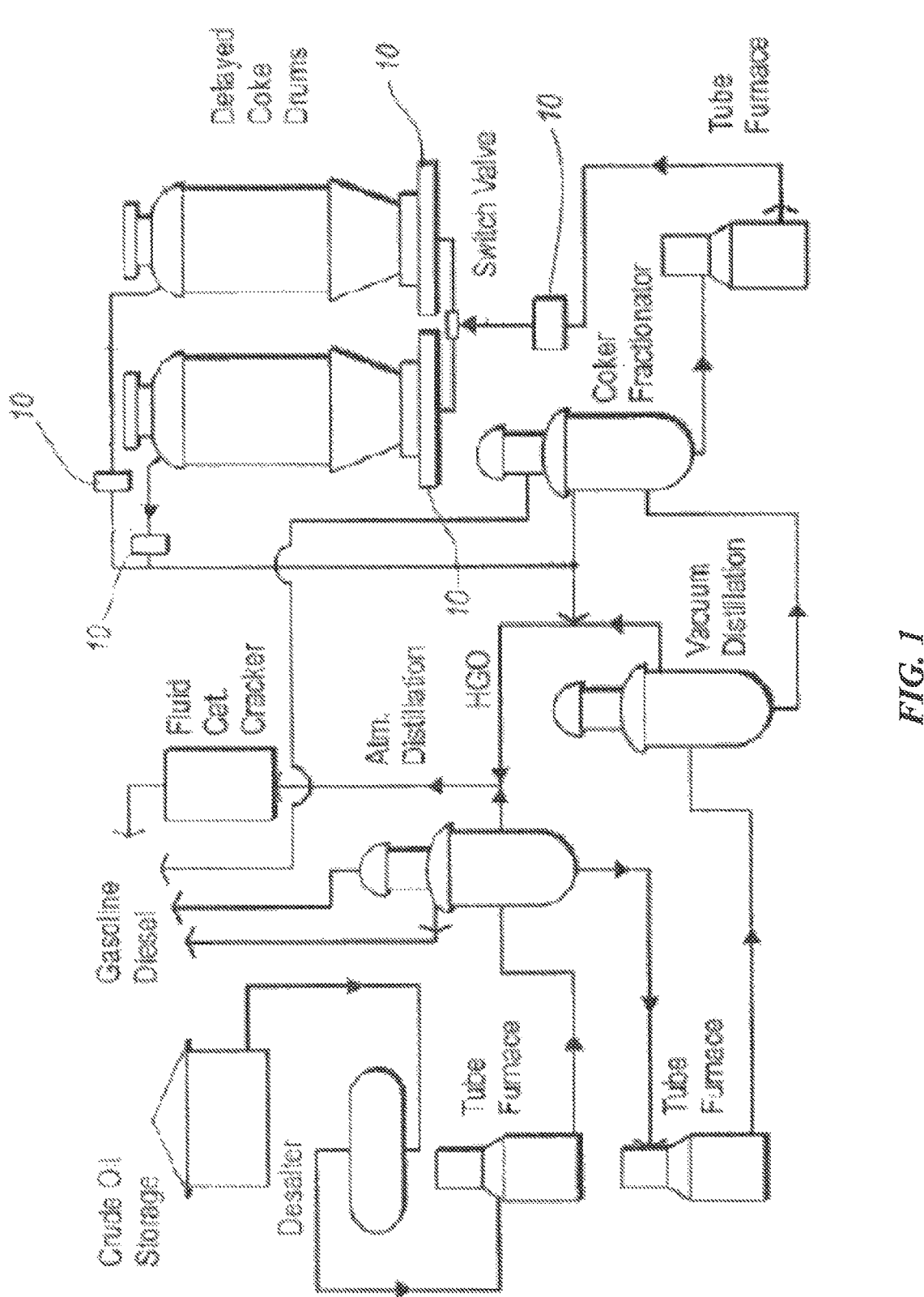
FIG. 1 illustrates a process.

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 3A-11 are not intended to limit the scope of the invention, as claimed, but are merely representative of present embodiments of the invention.

In some embodiments at a refinery or plant, an isolation valve is purged using a purge media refined at the refinery, such as hydrocarbons distilled in a fractionator. In some embodiments the fractionators distill the crude feed into component parts of heavy coker oils (HCO), medium coker oils (MCO) and light coker oils (LCO), as well as other fuels and gases and the bottom product oil from the main fractionator containing residual entrained catalyst in Fluid Catalytic Cracking and entrained coke particles in de-coking operations, referred to as a slurry oil. In some embodiments part of that slurry oil is recycled back into the main fractionator above the entry point of the hot reaction product vapors so as to cool and partially condense the reaction product vapors as they enter the main fractionator. In some embodiments part of the slurry oil is pumped through a slurry settler. The bottom oil from the slurry settler contains most of the slurry oil catalyst particles and is recycled back into the catalyst riser by combining it with the FCC feedstock oil. The clarified slurry fluid, also called slurry oil or decant oil, is withdrawn from the top of slurry settler for use elsewhere in the refinery, as a heavy fuel oil blending component, or as carbon black feedstock. The flow of this slurry oil in the slurry circuit is controlled by an isolation valve. Slurry oil is the oil most likely to leave deposits inside the valve, damaging the valve, thus in some embodiments the HCO, MOC, LCO or a combination of the oils is maintained under positive pressure greater than the pressuring the line so as to purge the isolation valve. When used as a purge media a small amount of the oil enters the process fluid through imperfect seals between the metal on metal surfaces in the valve. However, a percentage of the slurry is made up of hydrocarbons, so the oil is not contaminating the slurry.

The addition of liquid hydrocarbons to the slurry prevents cavitation in the pumps which pump the slurry through the bottom slurry circuit. In prior art circuits, gas leaking past the valve seats can cause rapid changes of pressure in a process fluid and lead to the formation of small vapor-filled cavities in places where the pressure is relatively low. Cavitation is not good for the pumps, and in some instances can damage the pumps. Using a liquid instead of a gas as a purge media avoids these problems.

Detailed references will now be made to the embodiments of the disclosed invention, examples of which are illustrated in FIGS. 3A-11 which illustrate various views of a valve with liquid media purge ports in accordance with one or more embodiments of the invention.

General Discussion on the Refining Process

Refining processes such as fluidic catalytic cracking and other refining processes may involve extreme pressures and temperatures. Isolation valves used in refining plants include internal components, which maintain the valve seal through the extreme temperatures and pressures.

Figure 2A:
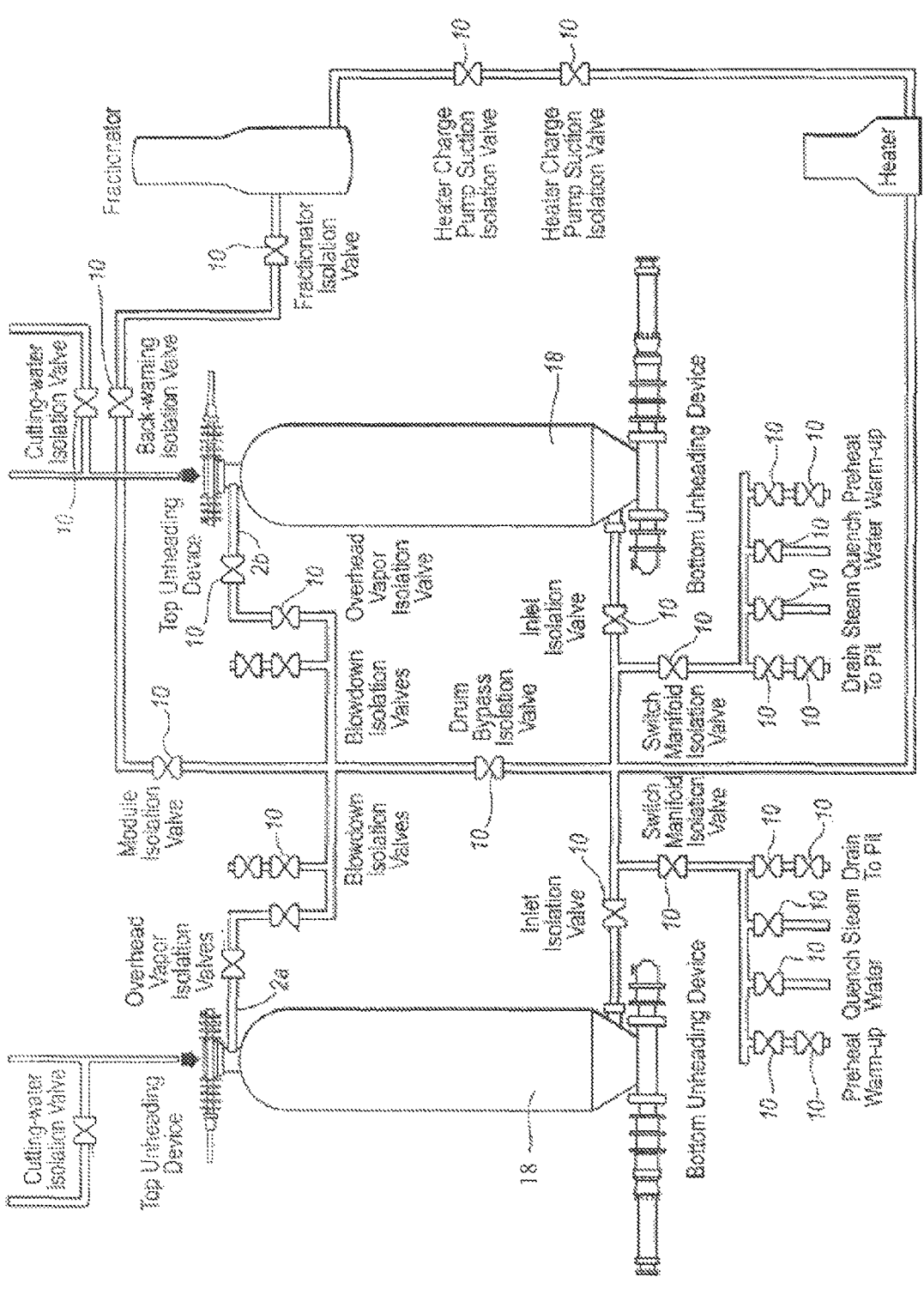
FIGS. 2A-2C illustrate an exemplary operation and identifies several potential positions for an isolation valve according to some embodiments.
Figure 2B:
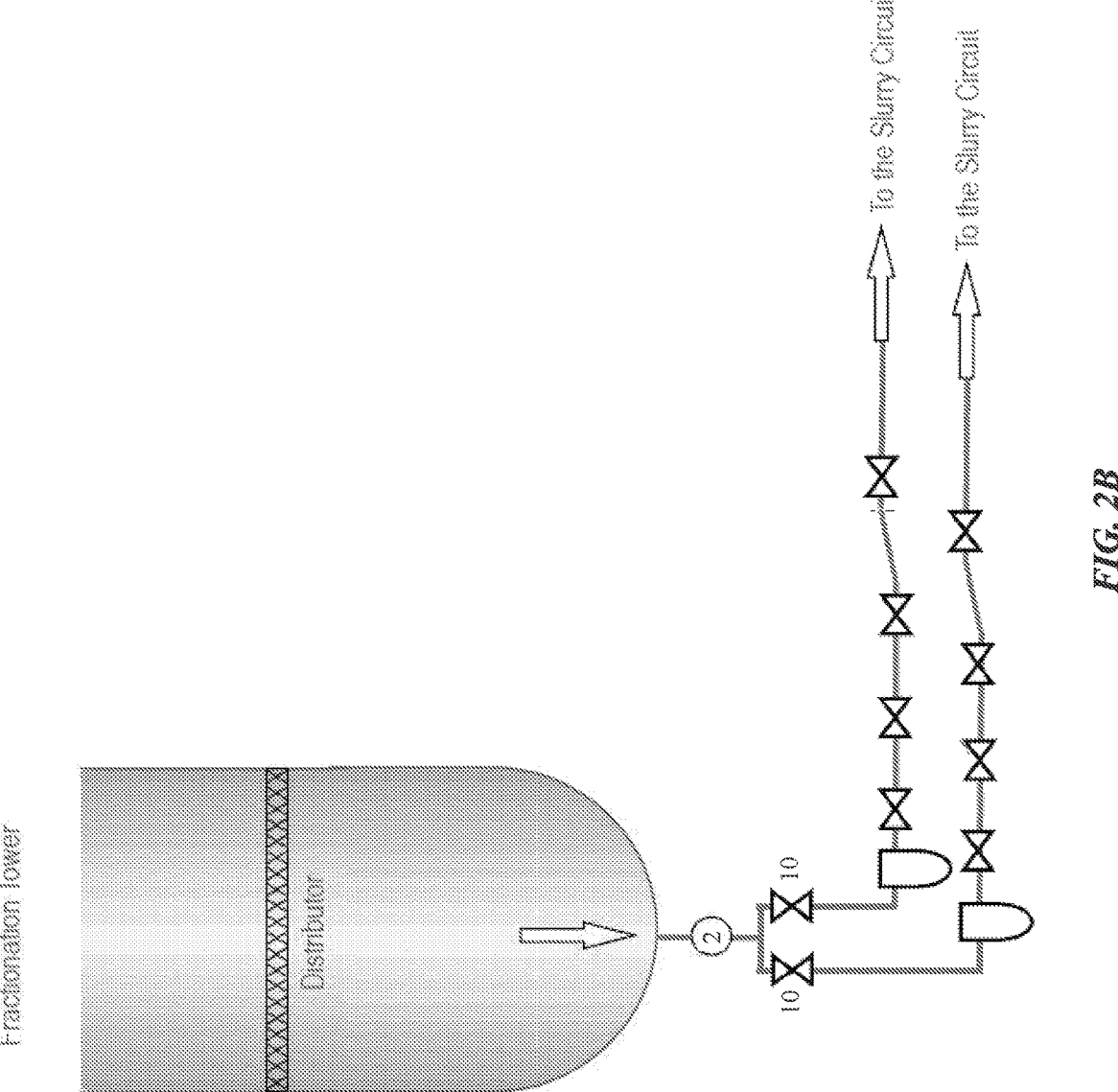
Figure 2C:
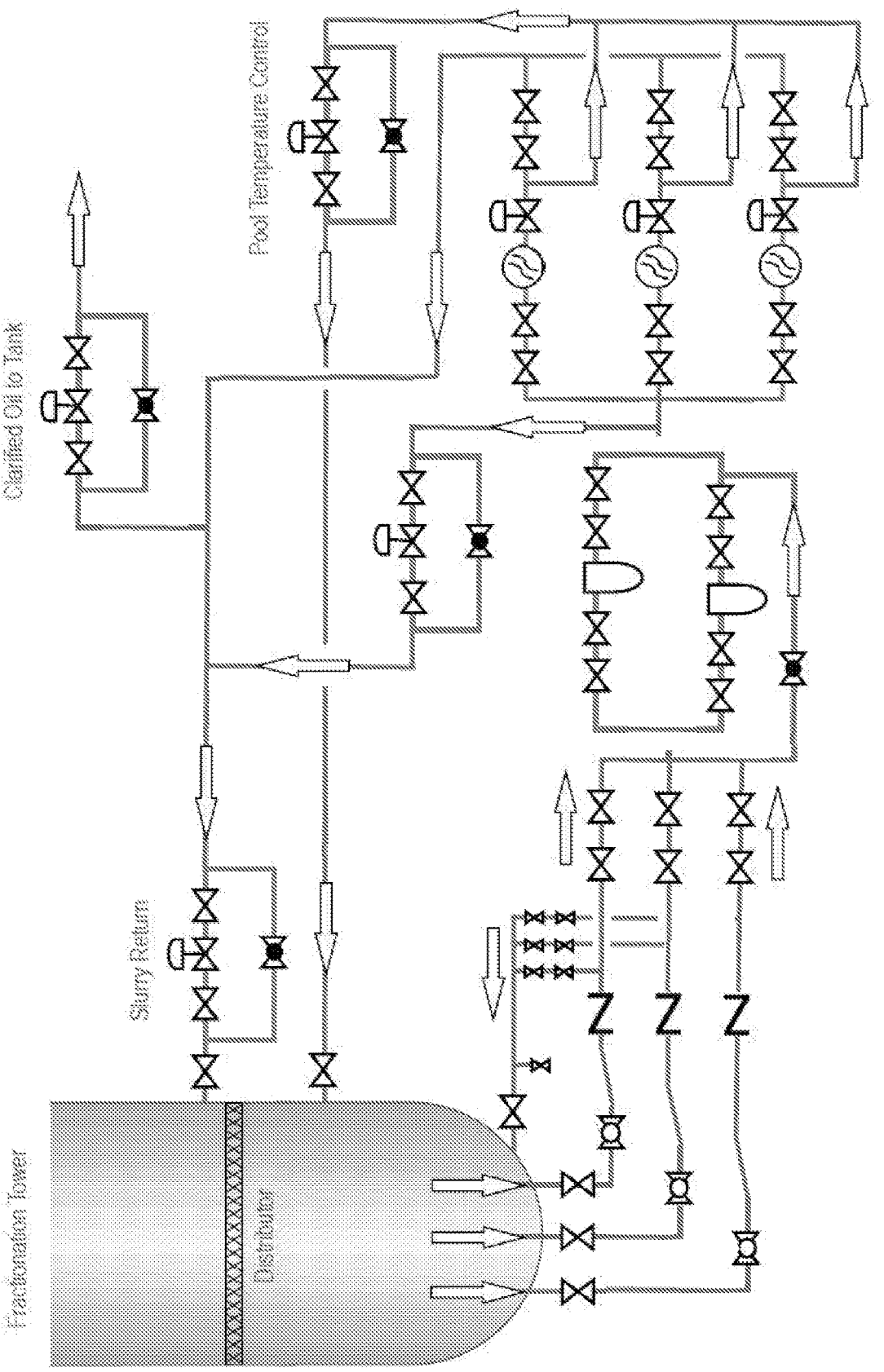
Figure 3A:
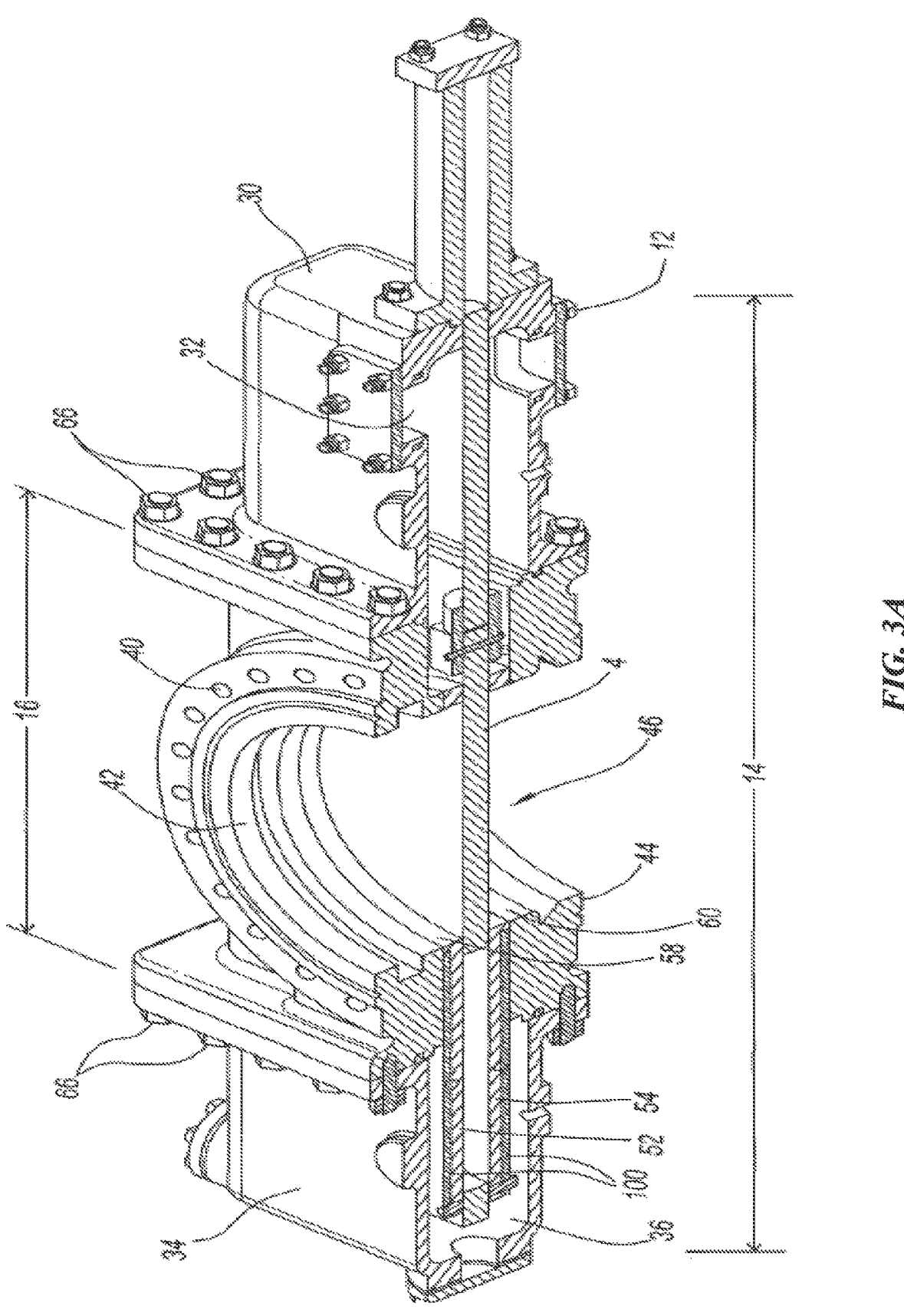
FIGS. 3A-3D illustrate a cutaway of some embodiments of an isolation valve in a closed position.
Figure 3B:
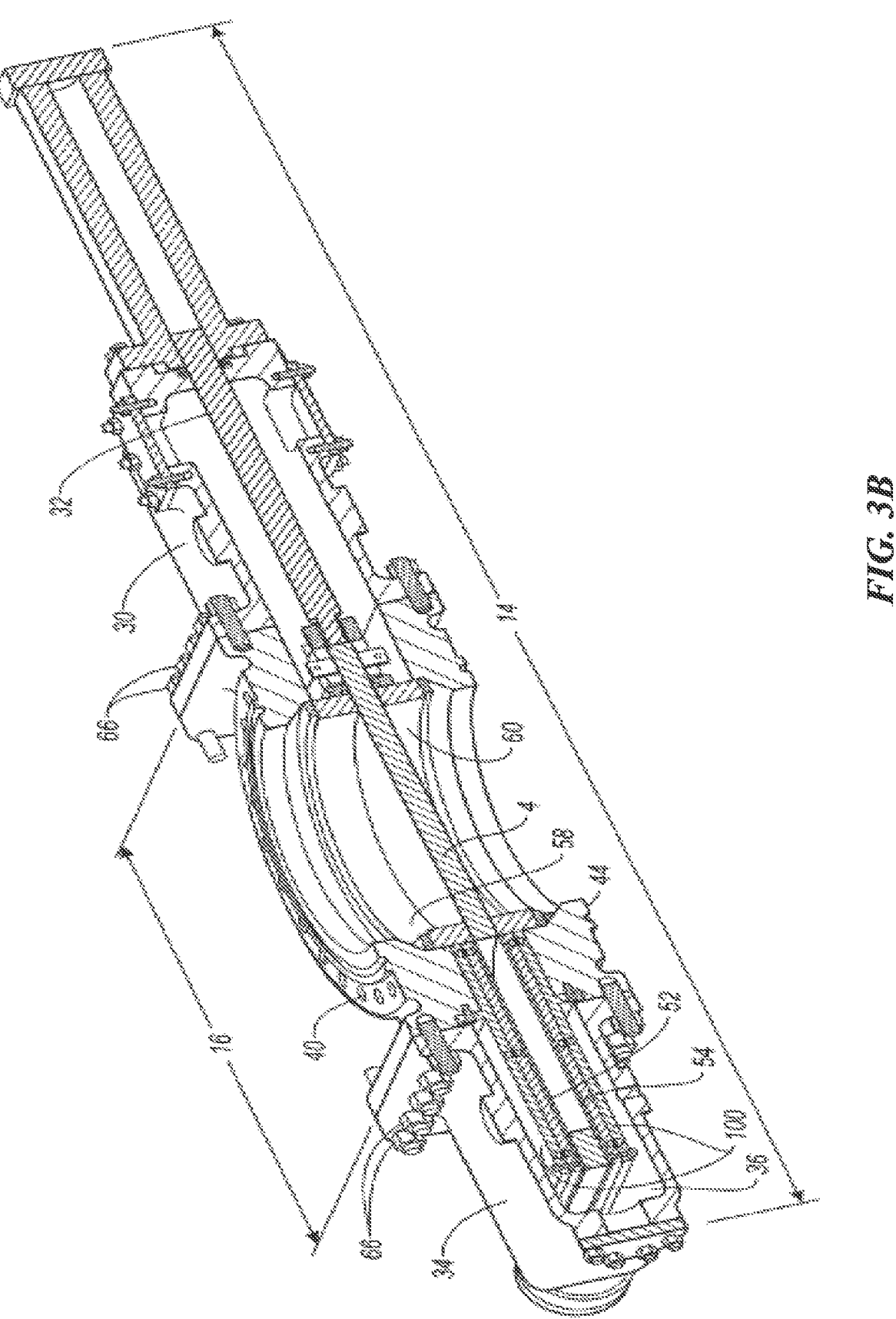
Figure 3C:
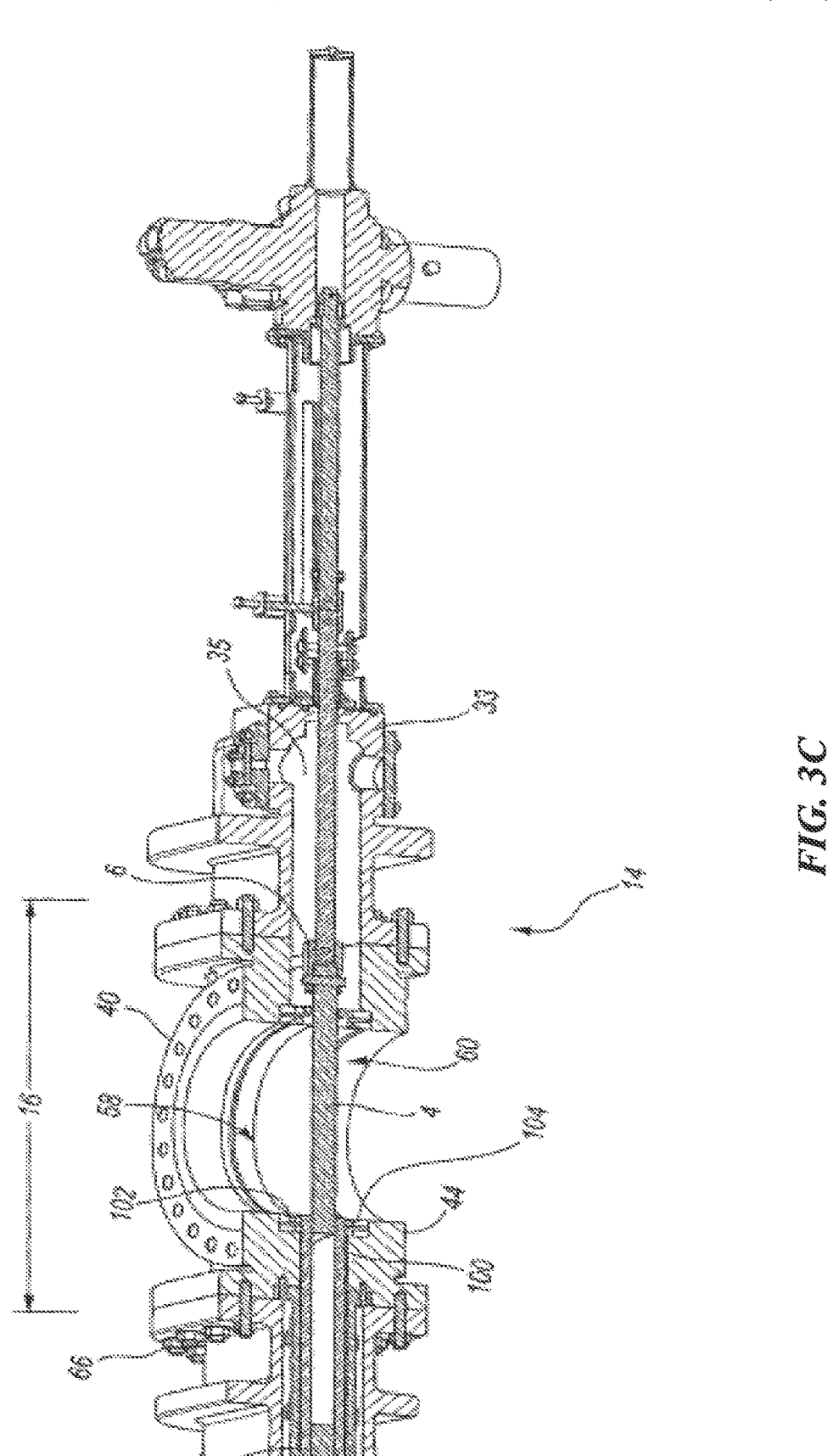
Figure 3D:
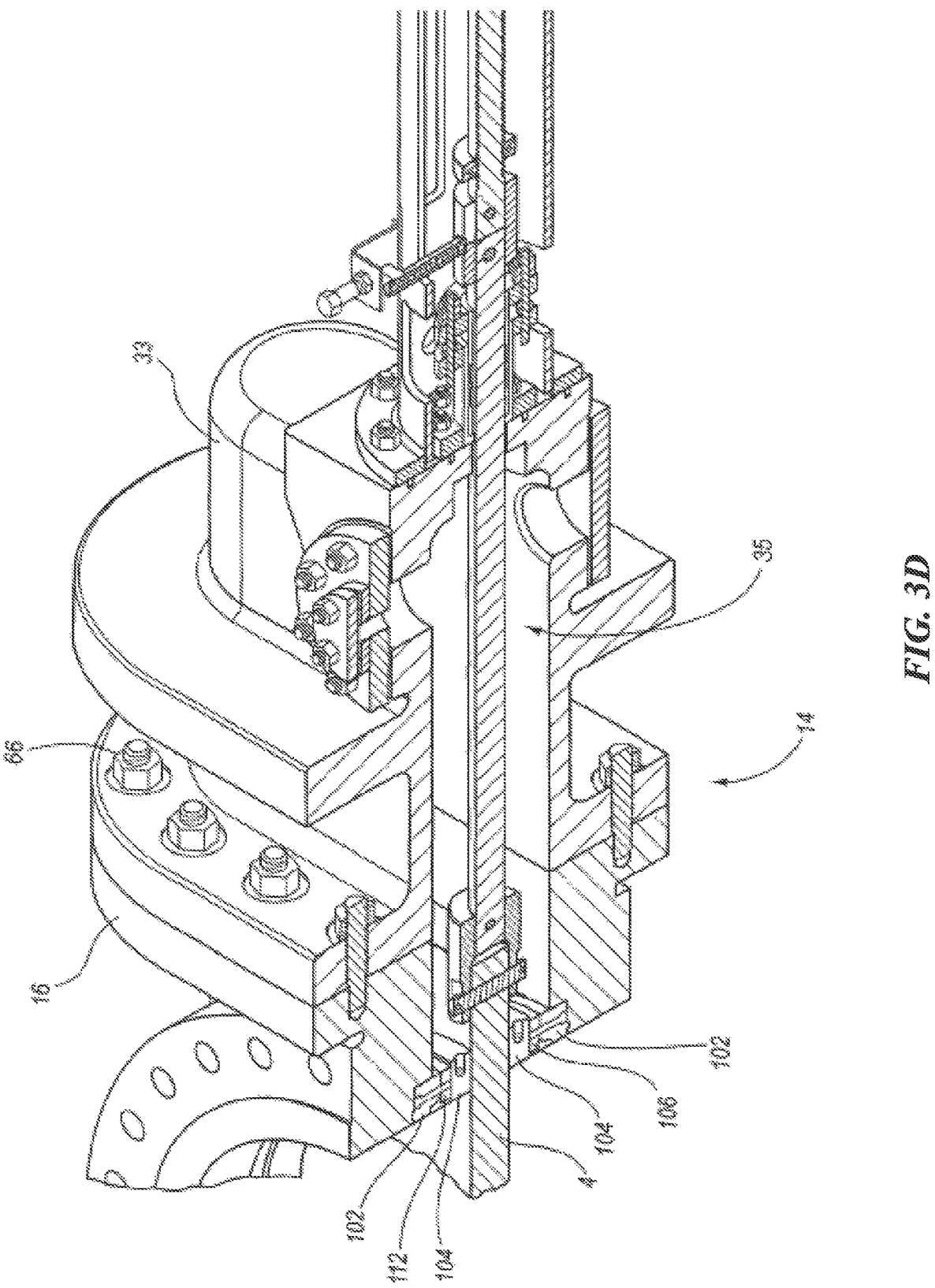
Figure 4:
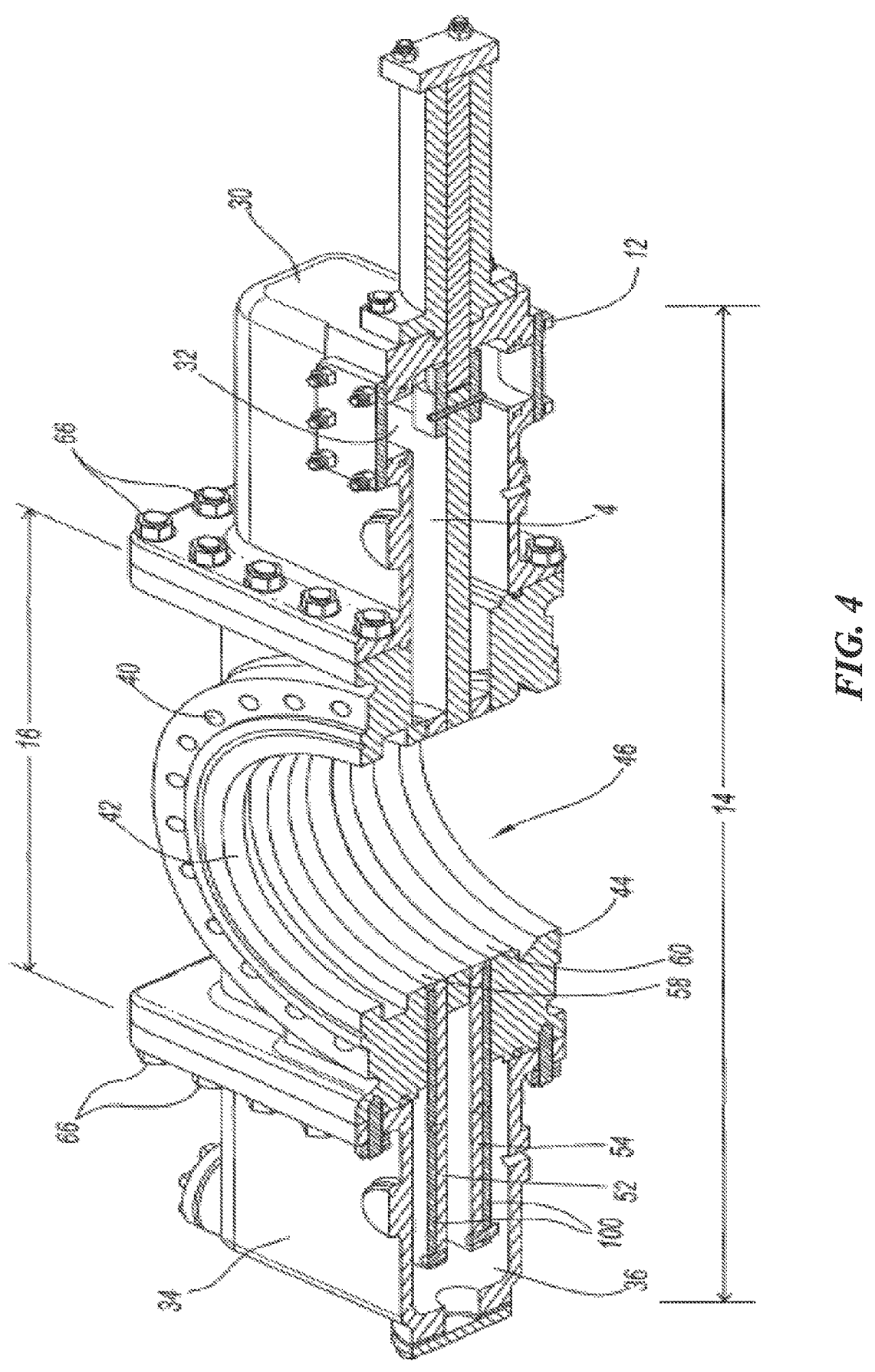
FIG. 4 illustrates a cutaway of some embodiments of an isolation valve in an open position.
Figure 5:
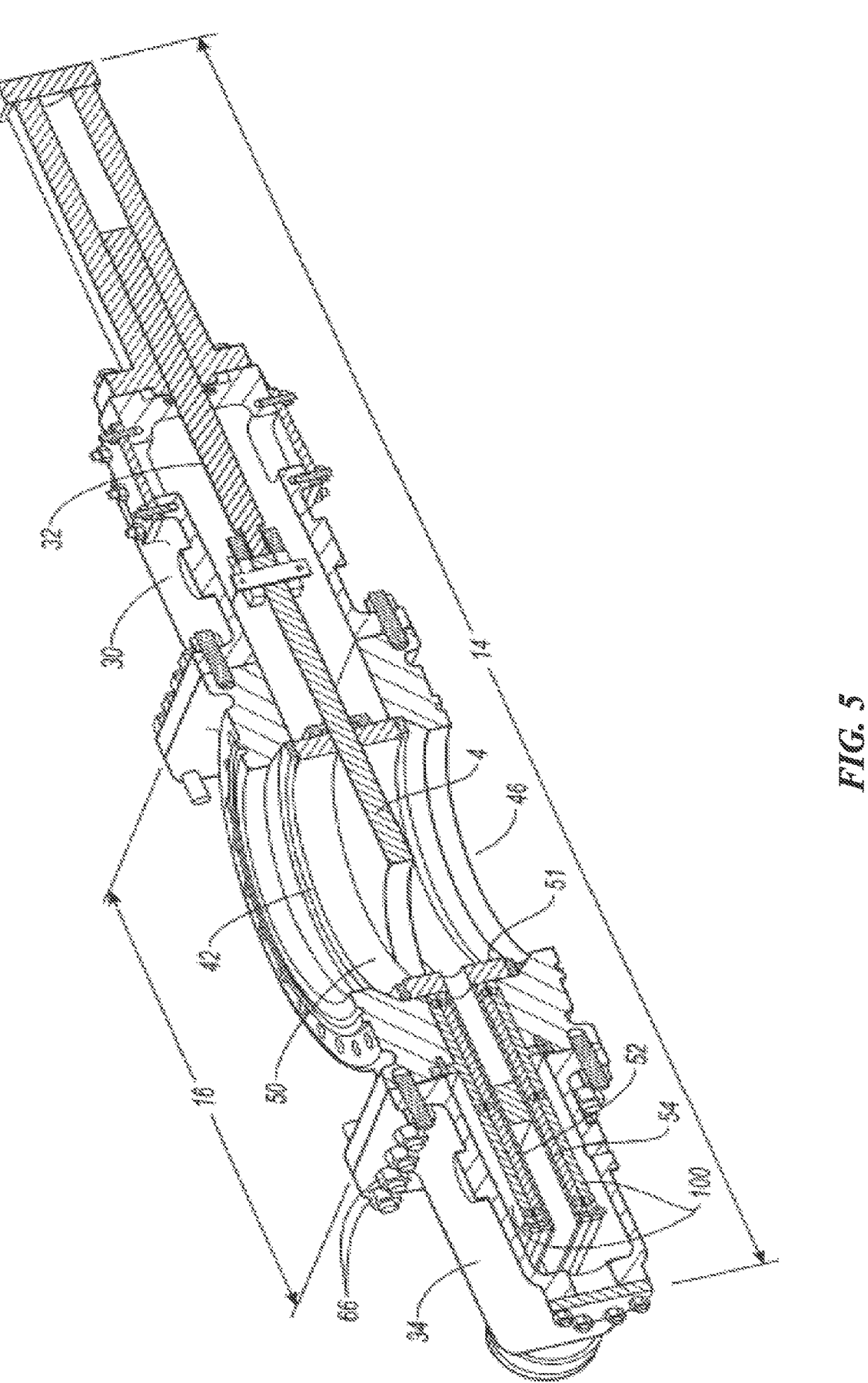
FIG. 5 illustrates an isolation valve in a partially open or throttled position according to some embodiments.
Figure 6:
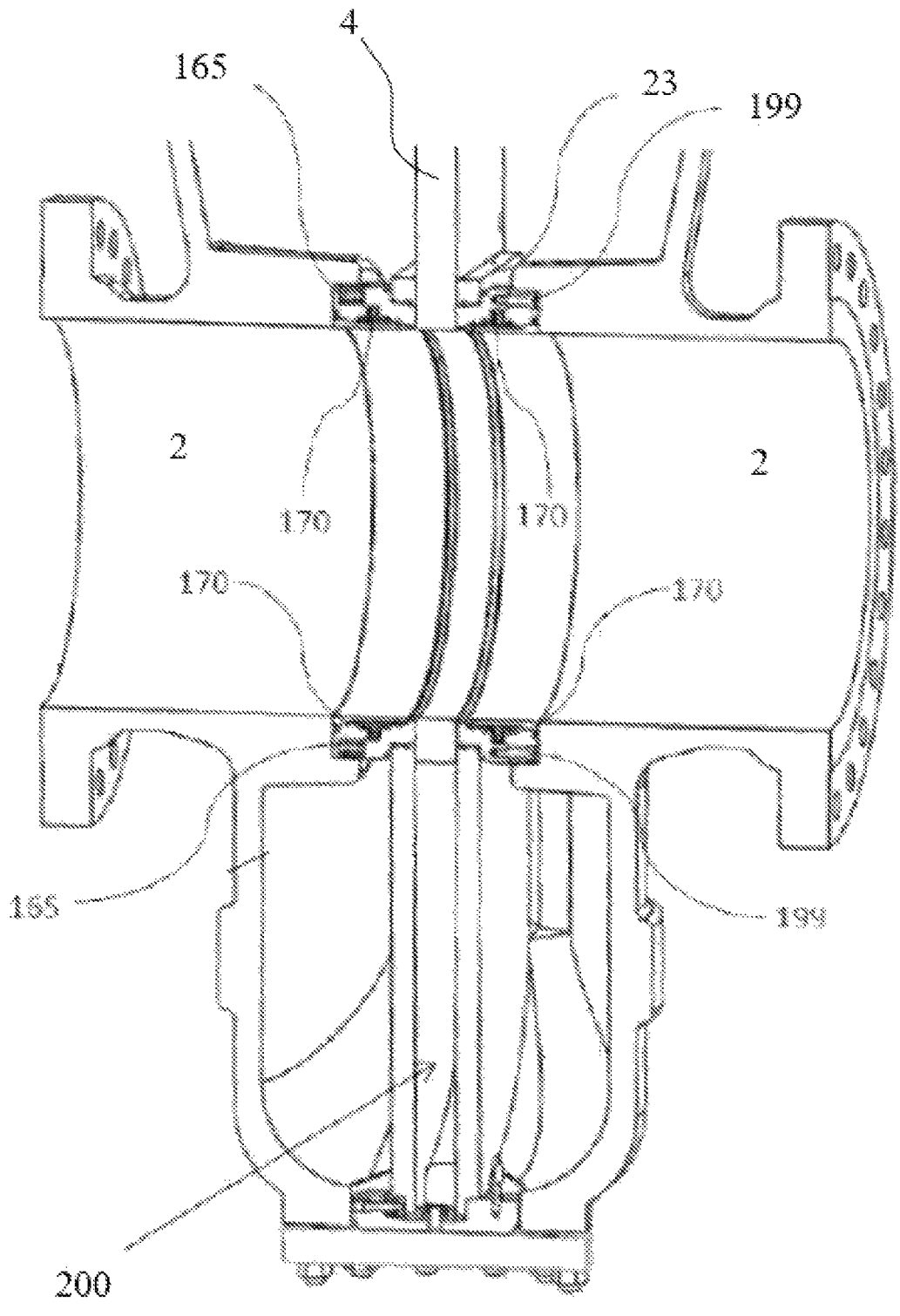
FIG. 6 illustrates close-up cut away view of the sealing assembly, bias assembly and liquid chamber.
Figure 7:
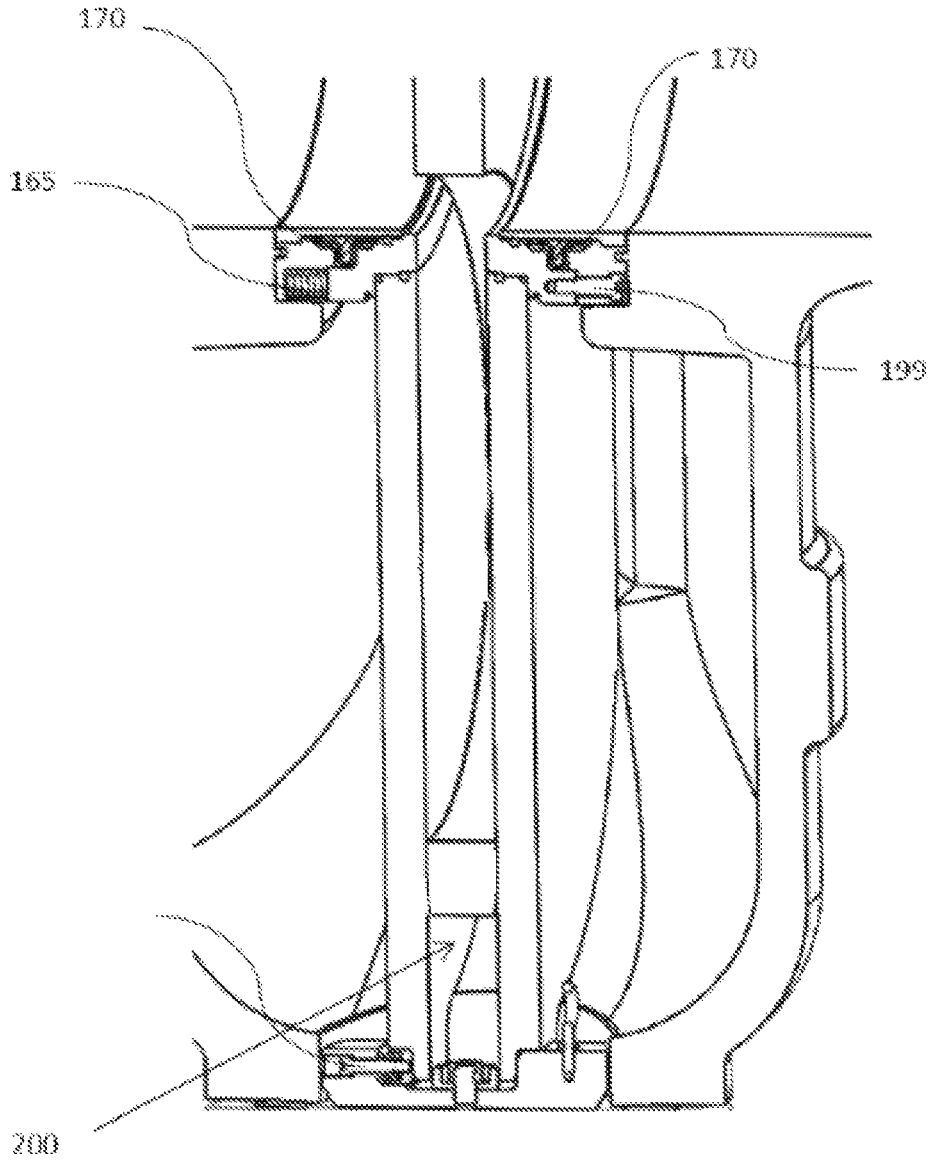
FIG. 7 illustrates cross-sectional view of floating seat assembly with liquid purge chamber.
Figure 8:
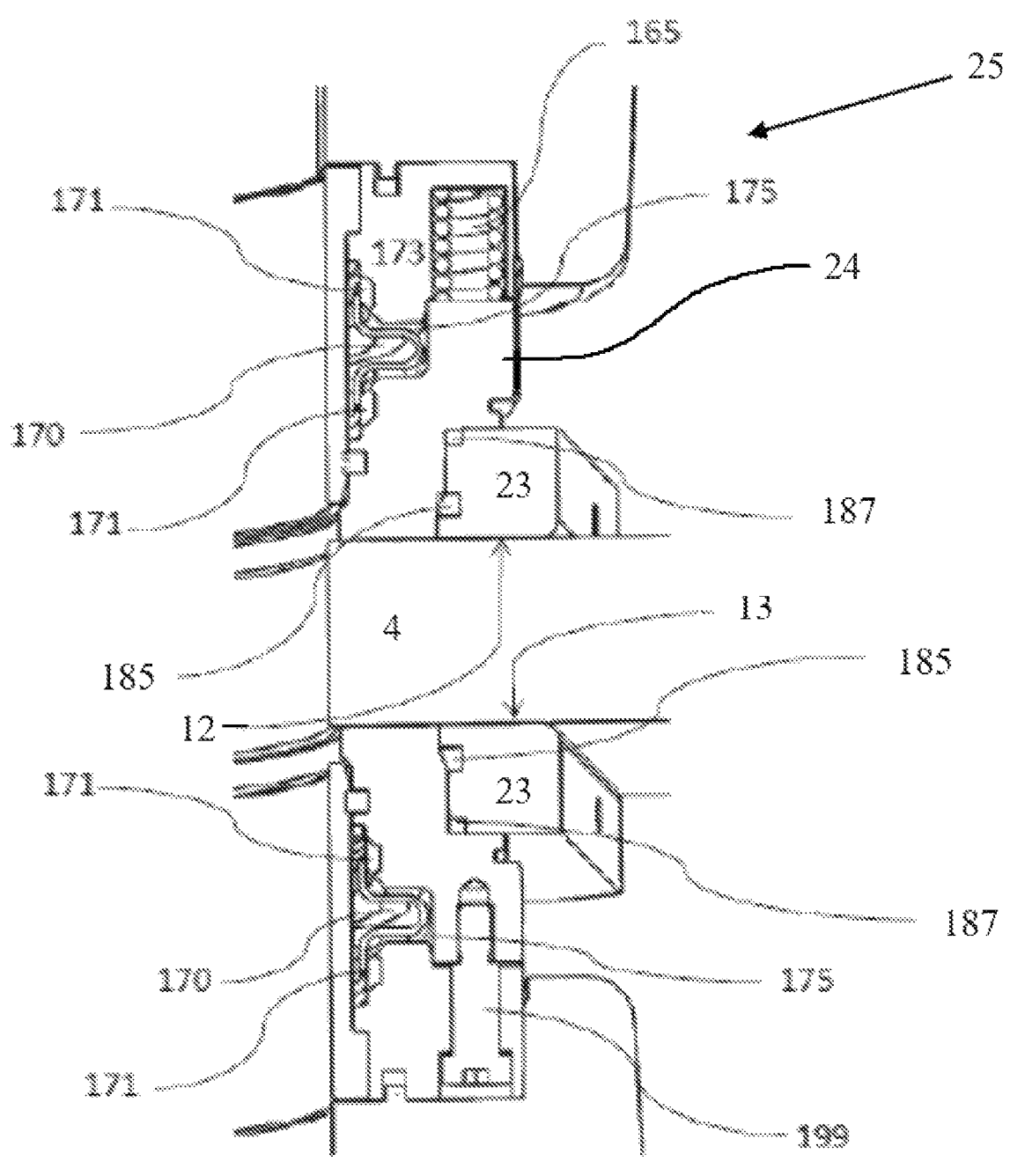
FIG. 8 illustrates a cross-sectional view of the bias assembly with and liquid purge chamber.
Figure 9:
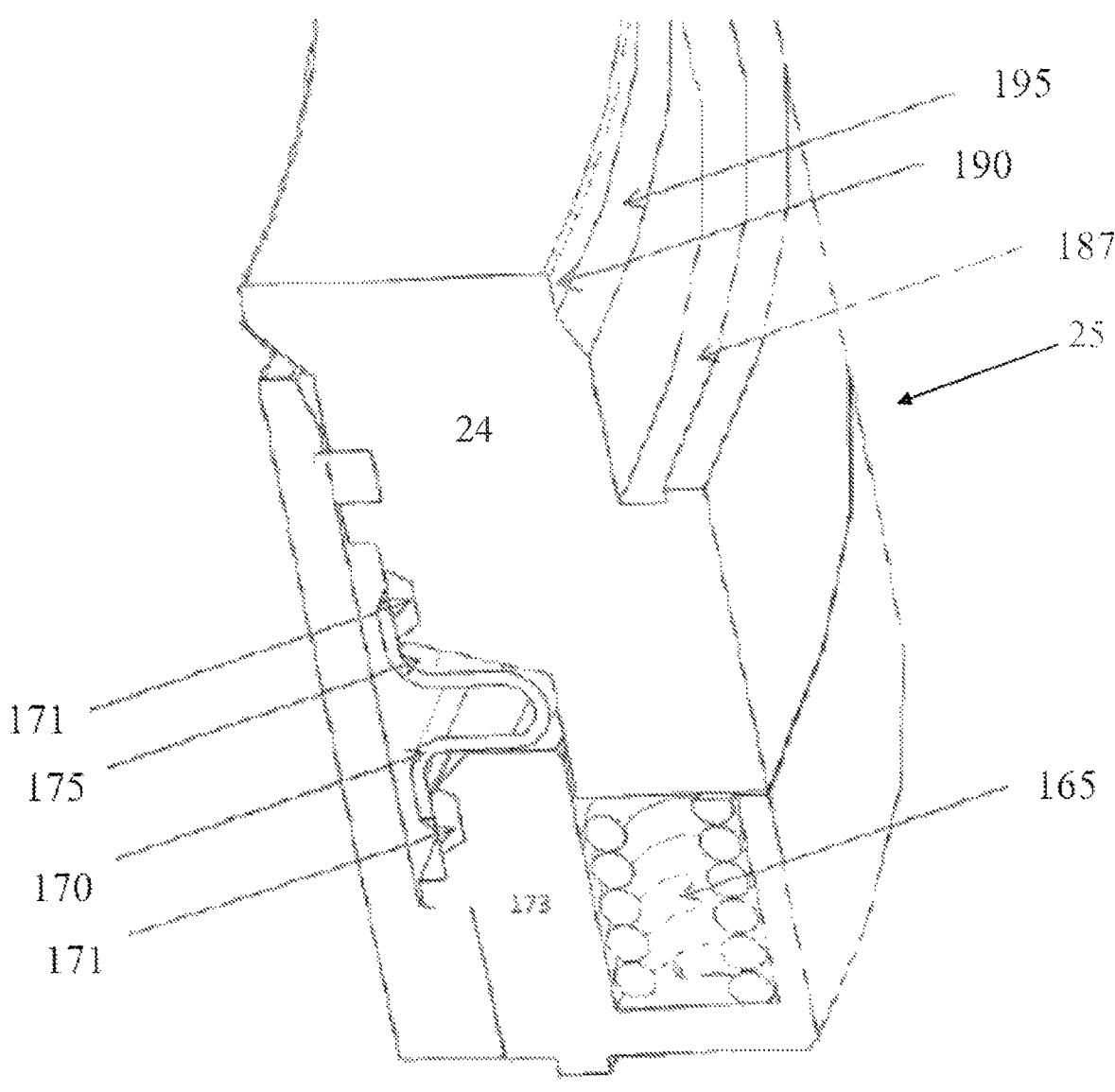
FIG. 9 illustrates a cross-sectional view of the valve seat with liquid purge chamber.
Figure 10:
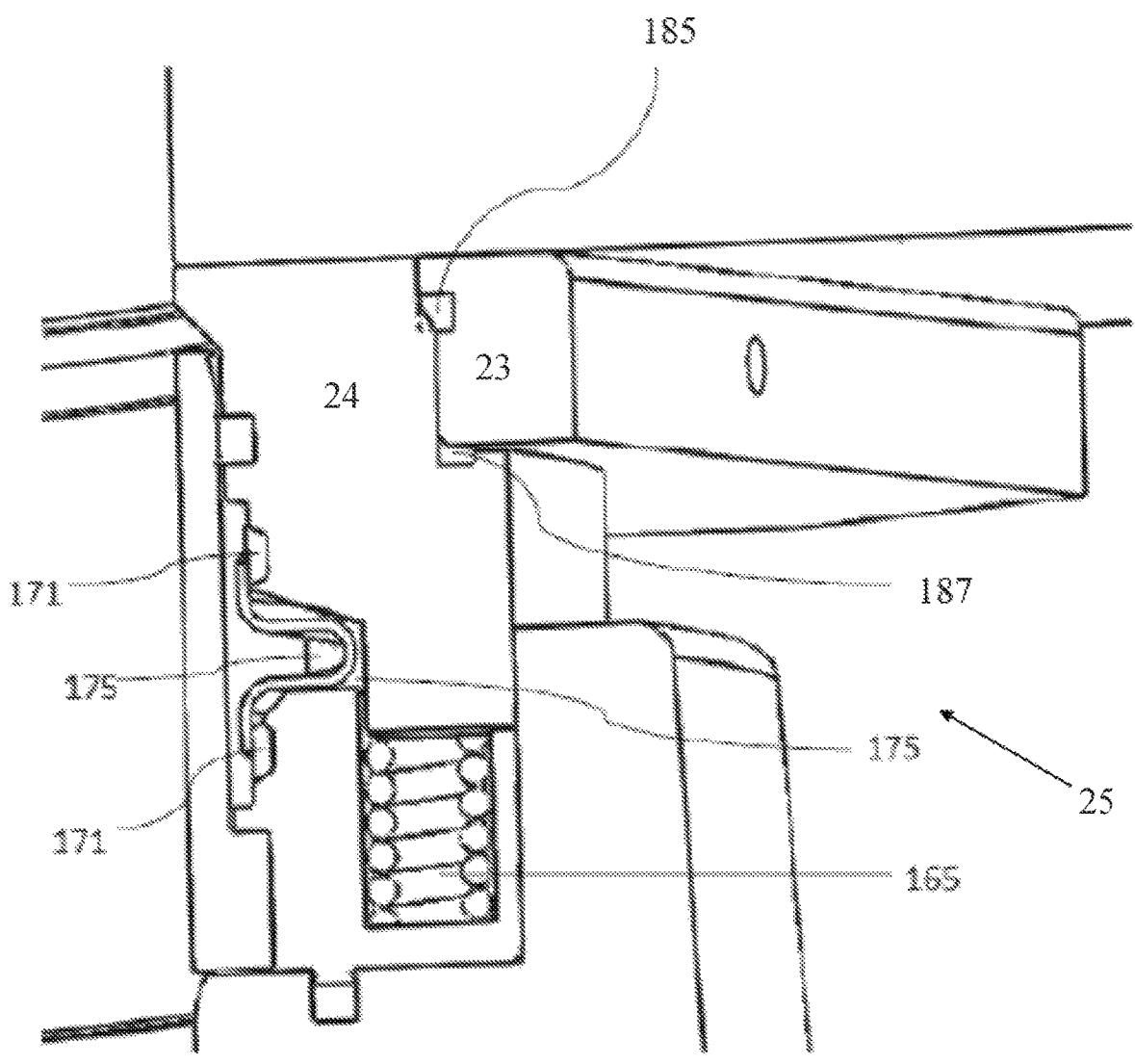
FIG. 10 illustrates an alternative cross-sectional view of the valve seat with liquid purge chamber.
Figure 11:
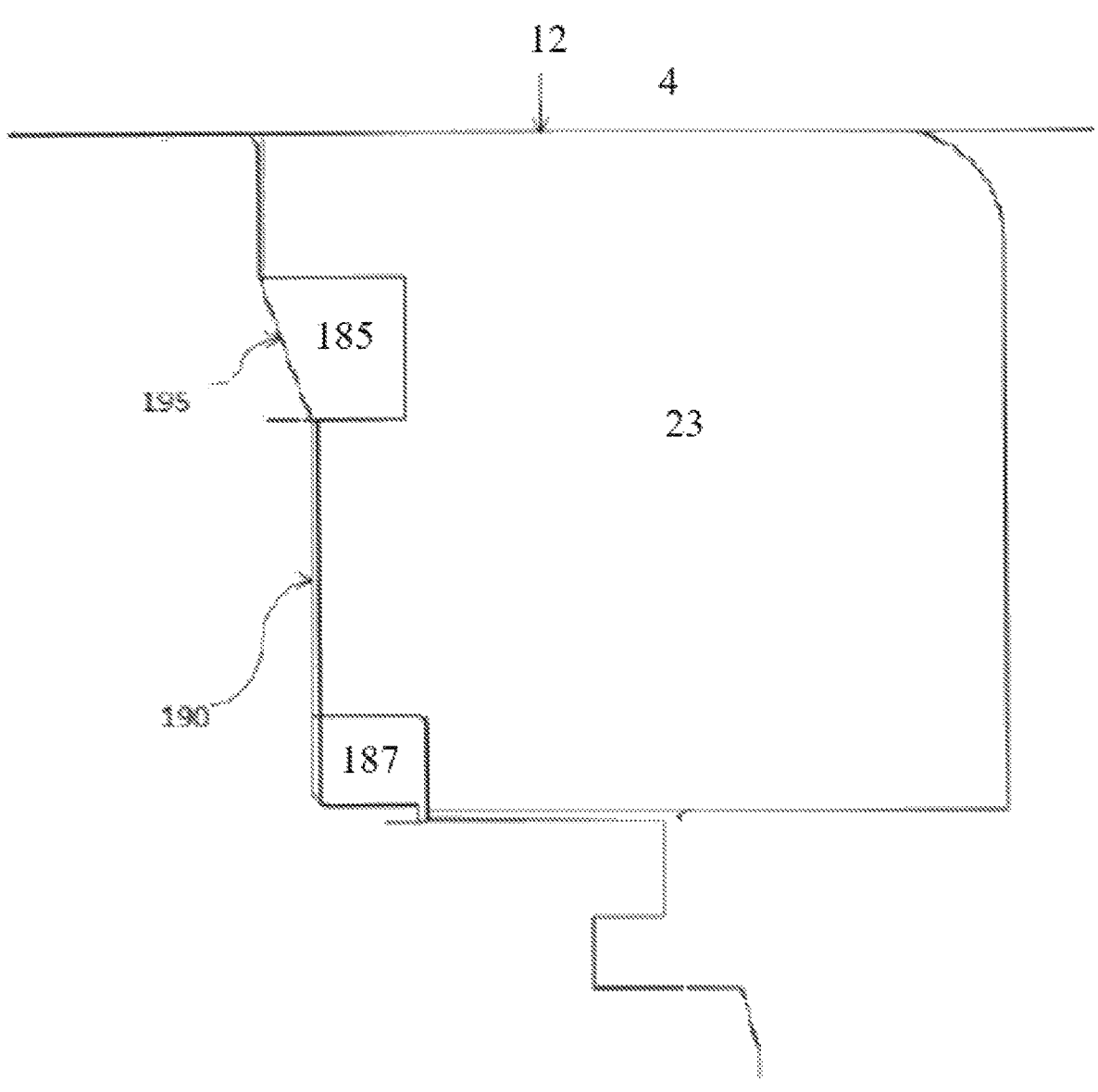
FIG. 11 illustrates an alternative cross-sectional view of the valve seat with liquid purge chamber.

Some refining processes are shown in FIGS. 2A-2C which illustrate exemplary refining operations, highlighting various lines utilized to convey matter, including gases, liquids and solids from one location to another throughout the operation. The schematic flow diagram of a typical modern unit in FIG. 2A is based upon a "side-by-side" configuration. The preheated high-boiling petroleum feedstock (at about 315 to 430° C.) consisting of long-chain hydrocarbon molecules is combined with recycle slurry oil from the bottom of the distillation column and injected into the catalyst riser where it is vaporized and cracked into smaller molecules of vapor by contact and mixing with the very hot powdered catalyst from the regenerator. All of the cracking reactions take place in the catalyst riser within a period of 2-4 seconds. The hydrocarbon vapors "fluidize" the powdered catalyst and the mixture of hydrocarbon vapors and catalyst flows upward to enter the reactor at a temperature of about 535° C. and a pressure of about 1.72 bar.

The reactor is a vessel in which the cracked product vapors are: (a) separated from the spent catalyst by flowing through a set of two-stage cyclones within the reactor and (b) the spent catalyst flows downward through a steam stripping section to remove any hydrocarbon vapors before the spent catalyst returns to the catalyst regenerator. The flow of spent catalyst to the regenerator is regulated by a slide valve in the spent catalyst line.

Since the cracking reactions produce some carbonaceous material (referred to as catalyst coke) that deposits on the catalyst and very quickly reduces the catalyst reactivity, the catalyst is regenerated by burning off the deposited coke with air blown into the regenerator. The regenerator operates at a temperature of about 715° C. and a pressure of about 2.41 bar, hence the regenerator operates at about 0.7 bar higher pressure than the reactor. The combustion of the coke is exothermic and it produces a large amount of heat that is partially absorbed by the regenerated catalyst and provides the heat required for the vaporization of the feedstock and the endothermic cracking reactions that take place in the catalyst riser.

The hot catalyst (at about 715° C.) leaving the regenerator flows into a catalyst withdrawal well where any entrained combustion flue gases are allowed to escape and flow back into the upper part to the regenerator. The flow of regenerated catalyst to the feedstock injection point below the catalyst riser is regulated by a slide valve in the regenerated catalyst line. The hot flue gas exits the regenerator after passing through multiple sets of two-stage cyclones that remove entrained catalyst from the flue gas.

The amount of catalyst circulating between the regenerator and the reactor amounts to about 5 kg per kg of feedstock, which is equivalent to about 4.66 kg per liter of feedstock. Thus, an FCC unit processing 75,000 barrels per day (11,900 m3/d) will circulate about 55,900 tons per day of catalyst.

The reaction product vapors (at 535° C. and a pressure of 1.72 bar) flow from the top of the reactor to the bottom section of the main column (commonly referred to as the main fractionator where feed splitting takes place) where they are distilled into the FCC end products of cracked petroleum naphtha, fuel oil, and offgas. After further processing for removal of sulfur compounds, the cracked naphtha becomes a high-octane component of the refinery's blended gasolines.

The main fractionator offgas is sent to what is called a gas recovery unit where it is separated into butanes and butylenes, propane and propylene, and lower molecular weight gases (hydrogen, methane, ethylene and ethane). Some FCC gas recovery units may also separate out some of the ethane and ethylene.

Although the schematic flow diagram FIG. 2A depicts the main fractionator as having only one sidecut stripper and one fuel oil product, many main fractionators have two sidecut strippers and produce a light fuel oil and a heavy fuel oil. Likewise, many FCC main fractionators produce a light cracked naphtha and a heavy cracked naphtha. The terminology light and heavy in this context refers to the product boiling ranges, with light products having a lower boiling range than heavy products.

The bottom product oil from the main fractionator contains residual catalyst particles which were not completely removed by the cyclones in the top of the reactor. For that reason, the bottom product oil is referred to as a slurry oil. Part of that slurry oil is recycled back into the main fractionator above the entry point of the hot reaction product vapors so as to cool and partially condense the reaction product vapors as they enter the main fractionator. The remainder of the slurry oil is pumped through a slurry settler. The bottom oil from the slurry settler contains most of the slurry oil catalyst particles and is recycled back into the catalyst riser by combining it with the FCC feedstock oil. The clarified slurry oil or d esaotoil is withdrawn from the top of slurry settler for use elsewhere in the refinery, as a heavy fuel oil blending component, or as carbon black feedstock.

Depending on the choice of FCC design, the combustion in the regenerator of the coke on the spent catalyst may or may not be complete combustion to carbon dioxide $CO_2$. The combustion air flow is controlled so as to provide the desired ratio of carbon monoxide (CO) to carbon dioxide for each specific design.

In the design shown in FIG. 1, the coke has only been partially combusted to $CO_2$. The combustion flue gas (containing CO and $CO_2$) at 715° C. and at a pressure of 2.41 bar is routed through a secondary catalyst separator containing swirl tubes designed to remove 70 to 90 percent of the particulates in the flue gas leaving the regenerator. This is required to prevent erosion damage to the blades in the turbo-expander that the flue gas is next routed through.

The expansion of flue gas through a turbo-expander provides sufficient power to drive the regenerator's combustion air compressor. The electrical motor-generator can consume or produce electrical power. If the expansion of the flue gas does not provide enough power to drive the air compressor, the electric motor/generator provides the needed additional power. If the flue gas expansion provides more power than needed to drive the air compressor, then the electric motor/generator converts the excess power into electric power and exports it to the refinery's electrical system.

The expanded flue gas is then routed through a steam-generating boiler (referred to as a CO boiler) where the carbon monoxide in the flue gas is burned as fuel to provide steam for use in the refinery as well as to comply with any applicable environmental regulatory limits on carbon monoxide emissions.

The flue gas is finally processed through an electrostatic precipitator (ESP) to remove residual particulate matter to comply with any applicable environmental regulations regarding particulate emissions. The ESP removes particulates in the size range of 2 to 20 μm from the flue gas. Particulate filter systems, known as Fourth Stage Separators (FSS) are sometimes required to meet particulate emission limits. These can replace the ESP when particulate emissions are the only concern.

The steam turbine in the flue gas processing system (shown in the above diagram) is used to drive the regenerator's combustion air compressor during start-ups of the FCC unit until there is sufficient combustion flue gas to take over that task.

The fluid catalytic cracking process breaks large hydrocarbons by their conversion to carbocations, which undergo myriad rearrangements breaking high boiling, straight-chain alkane (paraffin) hydrocarbons into smaller straight-chain alkanes as well as branched-chain alkanes, branched alkenes (olefins) and cycloalkanes (naphthenes). The breaking of the large hydrocarbon molecules into smaller molecules is more technically referred to by organic chemists as scission of the carbon-to-carbon bonds. Some of the smaller alkanes are then broken and converted into even smaller alkenes and branched alkenes such as the gases ethylene, propylene, butylenes, and isobutylenes. Those olefinic gases are valuable for use as petrochemical feedstocks. The propylene, butylene and isobutylene are also valuable feedstocks for certain petroleum refining processes that convert them into high-octane gasoline blending components. The cycloalkanes (naphthenes) formed by the initial breakup of the large molecules are further converted to aromatics such as benzene, toluene, and xylenes, which boil in the gasoline boiling range and have much higher octane ratings than alkanes. In the cracking process carbon is also produced which gets deposited on the catalyst (catalyst coke).

In particular FIGS. 2B-2C illustrate some of the locations where various embodiments of the isolation valves of the present invention may be utilized. Some embodiments of the valve 14 may be connected to any line or to a slurry circuit. In some embodiments hydrocarbons from the FCCU are routed into the functional space of an isolation valve, such as the bonnet under a positive pressure greater than the process media, such as a slurry. This is under positive pressure so as to prevent the process media from entering the valve housing. In some embodiments where the hydrocarbon purge media is used to purge the slurry circuit isolation valve mixes, the refined hydrocarbon purge media mixes with the process media where it is then returned to the fractionation tower for distillation.

The feedstock is usually that portion of the crude oil that has an initial boiling point of 340° C. (644° F.) or higher at atmospheric pressure and an average molecular weight ranging from about 200 to 600 or higher. This portion of crude oil is often referred to as heavy gas oil or vacuum gas oil (HVGO). In the process, the feedstock is heated to a high temperature and moderate pressure, and brought into contact with a hot, powdered catalyst. The catalyst breaks the long-chain molecules of the high-boiling hydrocarbon liquids into much shorter molecules, which are collected as a vapor.

Fractionation towers also known as, distillation columns or fractionators and isolation valves are used throughout refineries and chemical plants. The fractionation tower distills a chemical mixture into its component parts, or fractions, based on the differences in volatilities. Often fractionators have outlets at intervals up the column so that multiple products having different boiling ranges may be withdrawn from a column distilling a multi-component feed stream. The "lightest" products with the lowest boiling points exit from the top of the columns and the "heaviest" products with the highest boiling points exit from the bottom.

Fluid catalytic cracking (FCC) is one of the most important conversion processes used in petroleum refineries. It is widely used to convert the high-boiling, high-molecular weight hydrocarbon fractions of petroleum crude oils into more valuable gasoline, olefinic gases, and other products. Cracking of petroleum hydrocarbons uses a catalyst because it produces more gasoline with a higher octane rating. It also produces byproduct gases that have more carbon-carbon double bonds (i.e. more olefins), and hence more economic value.

The feedstock to FCC is usually that portion of the crude oil that has an initial boiling point of 340° C. (644° F.) or higher at atmospheric pressure and an average molecular weight ranging from about 200 to 600 or higher. This portion of crude oil is often referred to as heavy gas oil or vacuum gas oil (HVGO). In the FCC process, the feedstock is heated to a high temperature and moderate pressure, and brought into contact with a hot, powdered catalyst. The catalyst breaks the long-chain molecules of the high-boiling hydrocarbon liquids into much shorter molecules, which are collected as a vapor.

The feed stock passes through a reactor and into a fractionator where feed splitting takes place. In the fractionator the feed stock is distilled into the FCC end products of cracked petroleum naphtha, fuel oil, and offgas. After further processing for removal of sulfur compounds, the cracked naphtha becomes a high-octane component gasolines.

FCC main fractionators often have two sidecut strippers and produce a light fuel oil and a heavy fuel oil. Likewise, many FCC main fractionators produce a light cracked naphtha and a heavy cracked naphtha. The terminology light and heavy in this context refers to the product boiling ranges, with light products having a lower boiling range than heavy products.

The bottom product oil from the main fractionator contains residual catalyst particles. For that reason, the bottom product oil is referred to as a slurry oil. Part of the slurry oil is pumped through a slurry settler. The bottom oil from the slurry settler contains most of the slurry oil catalyst particles and is recycled back into the catalyst riser by combining it with the FCC feedstock oil. The clarified slurry oil or decant oil is withdrawn from the top of slurry settler for use elsewhere in the refinery, as a heavy fuel oil blending component, as carbon black feedstock, or in some cases the slurry oil is pumped through a bottom circuit for use in heat recovery or steam creation using a slurry bottom circuit.

Isolation valves are used in fluid handling systems to stop the flow of process media to a given location. Isolation valves can also be used to provide flow logic (selecting one flow path versus another), and to connect external equipment to a system. A valve is classified as an isolation valve because of its intended function in a system, not because of the type of the valve itself. Therefore, many different types of valves can be classified as isolation valves. Isolation valves must effectively stop the passage of fluids. Gate valves, ball valves, plug valves, globe valves and butterfly valves may be considered to provide tight and effective shut-off when the valve trim, or internal mechanisms, create the necessary seal.

Embodiments of an Isolation Valve

The present disclosure may be utilized in association with isolation valves, such as those described in U.S. patent application Ser. Nos. 12/848,013 and 16/403,039 which are incorporated herein by reference. The invention may be utilized on bottom slurry circuits, such as those shown in FIGS. 2B-2C, along with any isolation valve used in an FCCU. One ordinarily skilled in the art will recognize that the invention as explained and described herein use of fractionator hydrocarbons as a purge media for isolation valves may also be designed and used for other systems as well.

The present disclosure describes a valve purge media system and method for purging isolation valves such as those used in a bottom slurry circuit systems and methods may be utilized within other critical service applications, such as inlet feed line isolation, fractionator isolation, and back warming.

The present invention may be utilized to control the flow of process media, matter, including slurry fluid, any fluids, solids and/or gases, at any point in the isolation valve operation so as to prevent these from entering the valve trim eg bonnet, actuator, seat, seal and preventing proper operation. Additionally, one ordinarily skilled in the art will recognize that the valve as explained and described herein may also be designed and used in other environments where controlling the movement of matter, including fluids, solids and/or gases, is desirable.

Examples of isolation valves, and related internal trim is shown in FIGS. 3-11. The specification describes a valve system and method for isolating the flow of a substance in the line. As the present invention is especially adapted to isolation valves used to isolation bottom slurry circuit. It is foreseeable however, that the present invention may be adapted to be an integral part of other manufacturing processes producing various elements, and such processes should thus be considered within the scope of this application. Prior to reciting the specifics of the present invention, it should be noted that the present invention system and method is designed to have or possess significant functional, utility, and safety advantages over prior related designs and systems.

Some embodiments of the valve system may comprise a seat system for isolating the flow of slurry oil through a line from the bottom of the fractionator tower.

Some embodiments comprise: a) an valve coupled to a line in the FCCU operation wherein the line may be an outlet slurry oil line, and a seat system; and b) a structure for actuating the valve closure.

Some embodiments may comprise at least one bonnet. Some embodiments may comprise an upper and lower bonnet coupled to a main body, wherein the bonnet may be removed in order to replace valve parts without separating the main body from the line. Some embodiments may comprise one or more plates located inside a bonnet, wherein the plate(s) comprise a planar surface that may contact one or more surfaces on the blind.

Some embodiments of the system may be structured to isolate gases and hot liquids particularly those utilized in the FCCU operations. Some embodiments are structured to provide the benefit of allowing for reliable, extended flow isolation without decreased performance. In some embodiments, maintained high valve performance over extended periods of time is enhanced by features of the invention including purging the valve with LCO, MCO or HCO to maintain proper contact between the seats and blind which acts to remove any debris from the internal component of the valve. In prior art systems the likelihood of coking up or oiling up required frequent rebuilds and therefore removal of valves from a line.

In some embodiments, the system is configured to purge with hydrocarbon the main body of the valve, an upper and lower bonnet, each of which may be independently removed to replace valve parts without separating the main body from the line. Within the bonnets 30 of some embodiments there may be at least one plate 52 located in opposition to one another which allow the blind 4 to maintain surface contact with the plate(s). The positive pressure of the hydrocarbon purge along with the plate/blind 4/52 system located within the bonnets 30 prevent the escape of matter, such as slurry oil, from a line into the bonnet 30. Accordingly, some embodiments prevent exposure of the internal elements of the valve system 14 to matter traveling through the line. Consequently, the internal components of a valve system 14 may remain clean and free from debris and build up.

Some embodiments purge a structure for supporting a valve closure 4 comprising seat support system 50 with a liquid purge medium. A seat support system 50 may comprise an arrangement or configuration of seats depending upon the type of valve. In some embodiments the structure for supporting the valve closure 4 comprise a seat support system 50, which comprises a first seat and a second 58, 60 existing on either side of the valve closure 4, wherein the first seat 58 and the second seat 60 may be independent from one another. In some embodiments, the first seat 58 and the second seat 60 may be a pressurized seat cartridge. The first and second seats 58, 60 may comprise of either a static or a dynamic nature, such that one may be static and the other dynamic, both dynamic, or both static. Alternatively, the seat support system 50 may comprise of a single seat situated or disposed between the main body 16 of the valve 14 and the valve closure 4. In this configuration, this single seat applies continuous force to the valve closure throughout its oscillation. In single seat systems the single seat may be dynamic or it may be static depending upon the type of valve and the needs of the system specification and any other contributing factors.

Embodiments of the valve system comprise a liquid purge system wherein refined hydrocarbons from the fractionation tower are pumped to one or more isolation valves for use in the isolation valve as the liquid purge media. In some embodiments the liquid purge system may utilize a line to pull refined hydrocarbons from the fractionator to the bottom slurry circuit isolation valve for use as a liquid purge media. In some embodiments the liquid purge media is maintained at a positive pressure, or a pressure greater than the pressure in the line, so as to continually pump hydrocarbons into the line and prevent the process media, such as slurry oil, from entering the valve seat, bonnets, or other internal components. The pressure within the purge fluid system is maintained by using a fluid that is at a pressure greater than the process media in the valve.

Some embodiments of the liquid purge media system may comprise an internal gas/liquid containment system that provides or maintains isolation of the fluid including gas within the system. The internal fluid containment system may comprise a metal-to-metal contact seal described herein as well as a unique component configuration existing within the bonnets 30 of the valves 14. The liquid purge medium maintained at a positive pressure forced hydrocarbons through the metal-to-metal contact seals, to the extend fluid can pass, to prevent process fluid from passing the other way through into the valve's internal components.

In some embodiments the pumps pumping the liquid purge media to the isolation valve will be turned off when the internal components including the seat systems 50, seats and blind 4 may be inspected, repaired and/or replaced without detaching the main body 16 of the valve from the line.

In some embodiments the valve system 14 comprises a liquid-purged body where the purge media is maintained at a temperature that regulates the valve body temperature, and that may be structured to create a barrier against gas, fluid, and solid migration. The purge elements of these embodiments prevent the movement of matter into the upper and lower bonnets 30 from the line. Accordingly, the internal components of some embodiments do not become encumbered by coke deposits or build up. The internal components require significantly less repair and replacement. Accordingly, some embodiments of the valve operate reliably for extended periods of time without decreased performance.

Some embodiments are structured mechanically to work cooperatively with the liquid purge media by oscillating under conditions where valve gate 4 is maintained in a partially opened or throttled position. In some embodiments the internal components of the bonnet 30 prevent the build-up of oil, coke, or debris inside the bonnet 30. Because some of the embodiments have liquid purge fluid under positive pressure the internal components of the valve system 14 are not exposed to slurry oil, coke, and/or other build up while the valve 14 is maintained in a partially opened condition. For example, some embodiments of the valve system 14 utilize a liquid purge system which creates a positive pressure inside of the bonnet 30 forcing the contents of a line to remain inline and prevent the contents of the line from moving into the internal components of the valve 14.

In some embodiments, there may be additional mechanical features which operate cooperatively with the liquid purge media to allow the valve to be maintained in a partially opened position without compromising the performance of the valve over extended periods of time. For example, in some embodiments the seat system 50 maintains continuous contact with the gate 4. The continuous contact in some embodiments, shears accumulated coke and/or other debris preventing the accumulated material from building up upon the valve 14 itself and from falling into the various internal components of the valve system 14. Some embodiments utilize a system, which is located inside the bonnet 30, which maintain contact with the gate 4 of the valve 14 while the gate 4 moves through the open and closed positions. In some embodiments the bonnet 30, preferably the lower bonnet 34 of the valve 14, contains one or more plates 52 which opposably face each other and are biased against the surface of the gate 4 present within the lower bonnet 34. In some embodiments springs 54 are coiled and biased against the lower bonnet 34 to lie between bonnet 30 and plate 4. Accordingly, the spring system 56 of some embodiments press the plate 56 located in the lower bonnet 34 against the surface of the gate 4. The liquid purge media along with the plate system located in the bonnet system 30 prevents the movement of gases, fluids, or solid matter from the line into the bonnet 30. Accordingly, the combination of the liquid purge media system and plate system prevents the contents of the line from coming into contact with the internal elements of the gate system 14.

Turning to the Figures of the present invention and a more detailed analysis of some of the embodiments of the invention, FIG. 1 depicts, generally, a petroleum manufacturing and refinery process. Lighter fractions, steam and gases are released from the online coke vessel through the vapor line 2a and 2b.

FIG. 3A-3D depicts an embodiment of an isolation valve in an open position. In some embodiments, the valve as depicted may be connected one or more of the above described positions (scc FIG. 2). Each of FIGS. 3A, 3B, 3C and 3D illustrate different embodiments of valves 14.

The valve depicted in FIGS. 3-11 are an embodiment of isolation valves, however it is intended that valve 14 may comprise a variety of valve types, and a variety of different elements. The seat system 50 (e.g., the dual, metal seat surfaces in some embodiments), the bonnet interior 36, and all internal parts are fully protected and isolated from any matter flowing through a line while the valve is in the fully open, fully closed (see FIG. 4A) or partially opened (see FIG. 5A) positions. Preferably, the materials used in the construction of sealing parts are resistant to corrosion and are designed for exceptionally high metal-to-metal cycle duty. The seals of the valve 14 are designed to cleanly break the bond between the coke and the exposed surface of the valve closure at each stroke and the coke is prevented from entering the internal components by the liquid purge media. The total thrust required for this action combined with the thrust required to overcome seating friction and inertia is carefully calculated and is accomplished by actuating the valve closure 4, thus causing it to relocate or transition from a closed to an open position.

In some embodiments part of the liquid slurry is returned to the FCCU in an FCC process to recover hydrocarbons from the liquid slurry. A liquid purge media is used to purge the isolation valve of any process fluid, such as bottom slurry to prevent the process fluid from entering the valve body or bonnets. In some embodiments a check valve is used to maintain a pressure of greater than 10 psi in the system.

Using liquid purge medium provides added benefits over traditional steam or nitrogen. First, liquid purge medium is produced during the distillation process; in contrast, steam or nitrogen must be manufactured. Liquid slurry created downline is often pressurized in the process. Any portion of the hydrocarbon purge media injected into the liquid slurry while purging the isolation valve can be recycled back into the fractionator 11 above the entry point of the hot reaction product vapors so as to cool and partially condense the reaction product vapors as they enter the coker fractionator. The remainder of the liquid slurry is pumped through a slurry settler. The bottom oil from the slurry settler contains most of the liquid slurry catalyst particles in FCCU process and is recycled back into the catalyst riser by combining it with the FCC feedstock oil. FIG. 2D illustrates an exemplary operation, highlighting various lines utilized to convey matter, including gases, liquids and solids from one location to another throughout the operation. In particular FIG. 2A illustrates some of the locations where various embodiments of the isolation valve of the present invention may be utilized. Some embodiments of the valve 14 may be connected to any line or to a coke drum. Examples of some positions where embodiments of a valve may be utilized include cutting-water valve 70, overhead vapor valve 71A/71B, blowdown isolation valve 72A/72B, module isolation valve 79, back-warming isolation valve 80, fractionator isolation valve 10, drum bypass isolation valve 78, heater charge pump discharge isolation valve 82A/82B, inlet isolation valve 26, switch manifold isolation valve 73, pre-heat warm up isolation valve 74A/74B, quench water isolation valve 75, steam isolation valve 76, and drain-to-pit isolation valve 77A/77B.

FIG. 3A-3D depicts an embodiment of the valve system in a closed position. The depicted valve system 14 is structured to be coupled to a line or coke drum to a flange. In some embodiments, the valve as depicted may be connected one or more of the above described positions in the delayed coker unit operation (see FIG. 2A). Each of FIGS. 3A, 3B, 3C and 3D illustrate different embodiments of valves 14.

The valve depicted in FIGS. 3-11 are an embodiment of valves of the present invention, however it is intended that valve 14 may comprise a variety of valve types, and a variety of different elements.

FIGS. 3-13 illustrate various views of valve 14, according to various embodiments. The depicted valve 14 comprises a main body 16 coupled to upper and lower bonnets 33 and 34, each comprising lower chambers 35 and upper chamber 36, respectively. Main body 16 comprises a first flange portion 40 having an opening or port 42 therein, and a second flange portion 44 having an opening or port 46 therein. Main body 16 couples 26 to a complimentary flange portion and associated opening or port of a line 2 or coke drum 18 and 22, such that each opening is concentric and/or aligned with one another.

The depicted isolation valve 14 further comprises a valve closure in the form of a sliding blind or gate 4 having an aperture therein that is capable of aligning with openings 42 and 46 in an open position. Valve closure 4 slides back and forth in a linear, bi-directional manner between means for supporting a valve closure, shown in this exemplary embodiment as seat support system 50. Seat support system 50 may comprise any type of seating arrangement, including dual, independent seats, wherein the seats are both static, both dynamic, and a combination of these. Seat support system 50 may alternatively comprise a single seat in support of valve closure 4, wherein the seat may comprise a static or dynamic seat.

In one embodiment it is preferable that a continuous contact seal be created between valve closure 4 and seat support system 50, such that during the back and forth sliding or rotation of valve closure 4 from an open position, to a semi-opened position, and finally to a closed position, with respect to the line, the created contact seal is never broken or breached, but its integrity is maintained at all times. This continuous contact seal is preferably a metal-to-metal contact seal that performs several functions and has several advantages and operates cooperatively with the liquid purge media described herein. For example, the contact seal creates, or at least contributes to, valve 14 isolation, wherein an isolated environment is provided, such that no material is allowed to escape outside the sealed area and into the bonnets 30 or other parts of the valve 14, the area outside the valve, or other areas. Various liquid purge systems and containment systems may also function to regulate pressure within the isolation valve 14, to contain the material within designated areas, and to maintain valve isolation. As another example, the continuous contact seal may help to keep various components of the isolation valve clean and free of the product material as these materials are not allowed beyond the area purged by the liquid purge. As another example, as a result of the load exerted upon valve closure 4 and resulting tight tolerances existing between valve closure 4 and first and second seats and the rotation of valve closure between first and second seats 58, 60 causes a burnishing and polishing effect to occur.

In some embodiments, seat support system 50 comprise first and second seats 58, 60 as well as valve closure 4 may be made of metal, thus providing a metal to metal contact or metal to metal seal, or otherwise referred to as metal to metal seating of valve closure 4. The metal to metal seating increases the durability of the system as there are no non-metal parts, such as vinyl or rubber, used to seal the seats to valve closure 4. Metal-to-metal seating allows the system to achieve a higher consistency of sealing, while at the same time providing extended wear and durability. In addition, the metal-to-metal sealing allows the system 14, and specifically the scaling within the system, to be fine-tuned as needed. Each metal-to-metal contact seal in the valve body can be supported As the valve closure 4 is actuated and rotated from a closed position to an open position, the contact seal existing between the surface of valve closure 4 and the surface of means for supporting a valve closure functions to break up or shear the manufactured coke that has accumulated on or near the surface of valve closure 4.

Referring now to FIGS. 6-11 which disclose an alternative embodiment of a valve, such as a floating seat plate configured to isolate process fluid from entering the valve body purged by a liquid purge medium. In some embodiments separating the seat 23 from the floating seat plate 23 improves and simplifies manufacturing by requiring the smaller floating seat plate be ground flat instead of the combined seat plate 23 and seat 23. In some embodiments the floating seat plate 23 improves the distribution of loads on the seat. The improved load distribution is accomplished in part by the isolation of the seat plate 23 from the seat 23. Heat from processing causes the equipment, including the seat 23, gate 11 and the floating seat plate 23 to thermally expand and change shape. In addition, the pressurized drum challenges the seal between the seat 23, gate 11 and the seat plate In some embodiments the floating seat plate 23 isolates the pressure on the seat 23 so as to allow fewer leaks because the seat is not influenced by the seat attachment. Leaks are further reduced by the liquid purge medium under positive pressure so the resid cannot enter between the seals. In addition, in some embodiments the at least partially independent movement by the floating seat plate allows the seat 23 to partially isolate the pressures inside the drum body from impacting the seat, making the seat 23 pressure more uniform. Finally, separating the seat 23 and the floating seat plate 23 provides greater control and ability to manipulate the force between the floating seat plate and the seat 23 using the spring rates so that the seal is fully loaded by the seat.

In some embodiments the liquid purge media in combination with the floating seat plate improves the seal between the seat plate 23 and the seat 23 and the seal between the seat plate and the gate 11, particularly as the gate thermally expands and deforms. In some embodiments the seat plate is self-leveling against the gate and comprises a ball/cone and socket configuration to allow articulation by the seat. In some embodiments the cone and socket configuration is provided by the angled shelf 195 and packing 180 at the interface between the seat plate 23 and the seat 23. As the gate 11 or seat 23 thermally expand and change shape, the floating seat plate is able to articulate and maintain a seal independent of the orientation of the seat 23. In some embodiments the spring 165 presses the seat 23 against the gate 11 while a bellows 170 is activated by internal pressuring from the purge liquid 185 to expand the bellows 170 and assist the springs 165 to apply more load on the gate. Any gaps between the seat and seat plate interface are filled with liquid purge medium. The pressure created by the increased volume of purge liquid pumped into the chamber 175 on the valve side of the bellows adds to the pressure already created by the bellows to improve the scal between the seat plate 23 and the gate 11. In some embodiments the liquid purge medium is an incompressible fluid.

In some embodiments the valve comprises a first port 185. In some embodiments the valve comprises a plurality of internal chambers and ports 187. In some embodiments ports 187 are in fluid communication with the valve body so that purge liquid can transport from the valve body through ports 187 to purge liquid chambers 175 comprise channels formed in the seat assembly 145. In some embodiments the operation of the floating seat plate 23 and the pressurized liquid purge medium protect the ports 185 from process fluid in the body and which passes through the opening 20 as the drum is emptied. In some embodiments two seat plate directly abut seats 23 and gate 11 and prevent process fluid from entering the gate port 180. In some embodiments the valve comprises lower bonnet plates 34 configured to receive the gate 11 when it is placed in the closed position. In some embodiments the lower bonnet plates 34 isolate the valve body 14 from the process fluid which may migrate with the gate 11 as it is moved from a first position to a second position. In some embodiments the floating seat plate protects the port 185 at all times from the inside of the bonnet 30, 33 so when the gate 11 hole opens the opening 20 and prevent exposure of the ports 185 or the inside of the valve to the process fluid. The ports and channels 185 running through the valve and bonnet are sized to accommodate the liquid purge medium.

In some embodiments an isolation valve 14 is configured to isolate a valve body from the process fluid passing through the valve opening 20. In some embodiments a seat 23 has a receiving portion that is configured to receive a gate. In some embodiments the receiving portion is in the middle of the seat 23 body. In some embodiments the seat comprises a seat assembly 145 with a seat assembly 145 disposed on opposite sides of a gate 11 having a first side 12 and a second side 13 and aligned so as to create an opening through which process fluid can selectively pass. In some embodiments the two sides of the seat are bolted together to create a seal between the seat and the gate 11. In some placed two separate seats which are disposed adjacent the gate 11, with a first seat 23 adjacent first side 12 of the gate 11 and a second seat 23 placed adjacent the second side 13 of the gate 11. In some embodiments the gate 11 is configured to be selectively positioned intermediate a first seat and a second seat.

In some embodiments the seat assembly 145 comprises a floating seat plate. In some embodiments the floating seat plate is nested inside the inner circumference of the seat 23 so as to abut the seat 23. In some embodiments the floating seat plate 23 is concentrically nested between the seat 23 and a valve opening 20 without being attached to the seat 23. In some embodiments the seat plate is configured to articulate independent of the seat 23, to accommodate gate 11 deformations due to thermal expansion or thermal differentials created by greater heat being applied to one location over on the surface of the gate 11 such as when the heat is applied to the gate's first side 12 and not equally applied to the gate's second side 13. In addition, in some embodiments the floating seat plate 23 comprises degrees of motion to accommodate different pressures.

In some embodiments the seat assembly 145 comprises a sealing system 155 which improves the seal between the seat plate 23, the seat 23. In some embodiments the sealing system 155 comprises a bias system that selectively seals the seat plate 23 and the seat 23 that biases the seat plate 23 against the seat 23. In some embodiments the sealing system 155 comprises mechanical shapes and packing members 180 which are integrated at the interface between the seat and the seat plate.

In some embodiments the bias system 160 of claim 1 further comprises a first bias member 165. In some embodiments the bias system comprises a first bias member 165 and a second bias 170. In some embodiments the bias system comprises a first bias member 165, a second bias member 170, and a third bias member 175. In some embodiments the bias member comprises a spring 165. In some embodiments the bias member comprises a bellows 170. In some embodiments the bias member comprises a purge liquid chamber 175. In some embodiments the bias system 160 comprises any combination of bias members which function cooperatively to bias the floating seat plate 23 against the seat 23. In some embodiments the bias system functions to bias the floating seat plate 23 against the gate 11. In some embodiments the bias system comprises a plurality of bias members configured to bias the floating seat plate 23 against a first side of the gate 12 and to bias the floating seat plate 23 against the second side of the gate 13. In some embodiments the bias system 160 further comprises a third bias member positioned on the second side 13 of the gate configured to bias the seat plate 23 against the seat 23 in a direction of the gate configured to seal the seat plate 23 and the seat 23 against both the first side 12 and the second side 13 of the gate. In some embodiments the bias system comprises as bias assembly 145 limited in travel by a shoulder bolt 199.

In some embodiments the bias system 160 comprising a combination of cooperatively operating bias members improves the seal to meet American Petroleum Institute ("API") standards. In some embodiments the floating seat plate 23 is ground flat and positioned in the center of the gate 11. In some embodiments the seat plate 23 is biased against the seat using springs creating a force of nearly 200 PSI. In some embodiments, in addition to biasing the seat plate 23, the springs give the seat plate 23 degrees of freedom and allows the seat plate 23 to move and adjust so to maintain constant contact with the gate 11 and allows the seat plate 23 to remain in mutual contact with the gate 11 through the thermal cycle. In some embodiments the port 185 further comprises a purge liquid chamber which can be selectively pressurized to expand the chamber and further bias the seat plate 23. The purge medium is pumped into the purge liquid chamber and kept under positive pressure to push purge liquid through the seals and into the process fluid. The bellows 170 is welded 171 to a first packing 180, which in some embodiments is a seat plate 23, and a retainer 173. In some embodiments bellows 170 is welded 171 to the seat plate 23 and a packing 180 so as to seal the purge liquid in the purge liquid chamber 175. In some embodiments, purge liquid is pumped into chamber 175, as the purge liquid volume is increased the purge liquid chamber 175 expands the bellows 170 expands, increasing the pressure and the seat plate 23 is further biased against the seat 23 and the gate 11 to improve the seal between the gate 11 the seat 23 and the seat plate 23. In some embodiments the bias system creates a cumulative cooperative force sufficient to meet or exceed the API standards of 820 PSI.

In some embodiments the seat plate 23 comprises a shelf 195 which interfaces with the seat 23. In some embodiments the shelf 195 is angled to give the seat a conical shape as it mates with the seat 23. In some embodiments packing 180 is inserted into the seat-seat plate interface 190 and upon activation the angled shoulder 195 is pressed into the seat 23 at the interface 190 and energizes packing 180 by changing the shape of the packing 180. In some embodiments biasing the seat plate 23 against the seat 23 deforms packing 180. In some embodiments, when gate 11 deforms, the floating seat plate 23 articulates its position to maintain the seal between the seat 23 and the seat plate 23 and the gate 11 and the seat plate 23. In some embodiments floating seat plate 23 adjusts to the changing surface dimensions of the gate 11 as the gate 11 repositions from an open position to a closed position or a closed position to an open position. In some embodiments the packing 180 may be comprise a square cross section with dimensions that are approximately the same as the interface 190. In some embodiments the packing 190 will be slightly larger than the shape of the interface 190. In some embodiments packing 180 will comprise a segment of packing.

In some embodiments packing 180 provides the conically shaped floating seat plate 23 with freedom of movement to articulate with gate 11 thermal expansion as the valve moves through the thermal cycle. In some embodiments the seal is improved by pumping liquid purge medium into the valve body so the liquid purge medium fills any gaps that may form in the seal. In some embodiments the packing 180 further improves the seal between the seat 23 and the floating seat plate 23 even as the seat plate 23 repositions in response to gate 11 shape changes. In some embodiments the floating seat plate 23 maintains a radially biased force against the packing 180 and seat 23 and the gate 11 even as the shape of the gate 11 changes. In some embodiments the floating seat plate 23 maintains a radially biased force against the packing 180 and the seat 23 and the gate. In some embodiments the seat plate 23 and packing 180 isolate the seat 23 from pressure in the body during processing.

In some embodiments packing 180 allows the floating seat plate 23 end-to-end movements so gate 11 and floating seat plate 23 and seat 23 touch simultaneously. In some embodiments the packing 180 does not necessarily seal the interface between the seat plate 23 and the seat 23, but instead provides for axial movement so the seat plate 23 can become mutual with the seat 23. Thus, in some embodiments as the gate 11 deforms under thermal expansion the seat plate 23 can reposition independent of the seat to improve the contact, and thus the seal between the seat plate 23 and the gate.

In some embodiments in addition to being welded 171 to the seat plate 23 to isolate purge liquid, bellows 170 is cooperatively biased with the seat plate to enhance and improve the sealing force between the seat plate 23, the seat 23 and the gate 11. The bellows 170 is welded 171 to the seat plate assembly 145 to isolate a purge liquid chamber 175. In some embodiments the bellows 170 is configured to flex as purge liquid volume, and resulting pressure is applied to increase the bias force of the seat plate assembly 145 against the gate 11. In some embodiments the bellows 170 is made from materials which can be welded. In some embodiments bellows 170 comprises INCONEL®, a nickel chromium-based superalloy or a nickel alloy (e.g. a Monel® alloy). In some embodiments bellows 170 are configured with a single spring fold 166, while in some embodiments bellows 170 is configured with multiple spring folds 166, the number of folds is determined by the force required and the amount of desired movement. In some embodiments bellows 170 comprises bellows tabs which overlap with adjacent structures. In some embodiments bellows tabs provide a welding surface 171 wherein the bellows tab is welded 171 to the adjacent structure. In some embodiments the adjacent structure comprises the floating seat plate 23. In some embodiments a bellows tab is welded 171 to a packing 180. In some embodiments, the purge liquid chamber 175 is configured on the surface of the bellows 170 which faces away from the central opening 20, while in some embodiments the purge liquid chamber 175 is against the bellows surface 175 which faces towards the central opening 175. In some embodiments purge liquid enters purge liquid chamber 175 through port 185, increasing volume of the purge liquid chamber 175. In some embodiments the chamber 175 volume increase and the purge liquid cooperatively biases other bias members such as spring 165 and bellows 170 to increase the bias force seat plate 23 places against the seat 23 and the bias force the seat plate 23 exerts against the gate 11 and the force the seat 23 places against the gate 11. In some embodiments bellows 170 is a solid sheet of material that is folded and compressed to maintain a bias.

The weld 171 may be formed by any suitable technique including but not limited to electric arc, laser welding, TIG and electron welding to name a few examples. This weld 62 ensures a fluid tight joint or seal between the bellows 170 and the packing 180 so that fluid flow in the valve opening 20 is restricted to between the first and second ports 36, 38 and also that process fluid does not enter into the upper bonnet 30 and lower bonnet 33 actuator 65 or escape to the outside environment.

In some embodiments the valve is configured to continuously force purge liquid through the port 185 and purge liquid chamber 175. In some embodiments the purge liquid is kept under positive pressure in the to continually force purge slurry out of the valve body and into the valve opening 20 to prevent process fluid from entering the bonnets, purge liquid chamber 175, the port 185, or the valve body 35. In some embodiments the seat plate 180 maintains constant contact and load against the gate 11 to keep sealing surfaces 25 protected. In some embodiments the purge liquid is forced a high pressure through the purge liquid chamber 175, the port 185, or the valve body 35 purge the spaces of any fluid process which may have entered during the stroke. In some embodiments the seat plate 23 is an extended seat plate 197 that maintains constant contact with the gate 11 in all positions through the gate stroke such that all process is captured and not allowed to enter the body chamber 35.

In some embodiments packing 180, 185 changes shape as floating seat plate 23 presses on packing 180 and radially compresses the packing 180 to improve the seal between the seat plate 23 and the seat 23. In some embodiments packing 180 cushions the floating seat plate 180 seat 23 interface 190 to permit seat plate 180 to maintain its degrees of freedom under bias, thus even as the gate 11 thermally expands under the heat and pressure of the heat cycle, the floating seat plate 180 "floats" or articulates to maintain the seal between the seat plate 180 the seat 23 and the gate 11 in a ball/cone and socket manner. In some embodiments the valve comprises two floating seat plates 180 to allow for sufficient axial seat travel upstream and downstream in the opening 20 to balance the sealing load on both sides of the gate 11. In some embodiments the shoulder bolt 199 acts as an axial hard stop on each seat on each side of the gate 11 allowing the upstream seat 23 to maintain its sealing contact with the gate 11. A retainer In some embodiments the extended seat plates 23 on each side of the gate 11 prevent the process from entering the body as the valve closes the gate port and exposes the process into the body, typically on other through conduit slab gate valves. In some embodiments extended seat plate 23 are dynamic and spring loaded by the caliper in the bottom of the valve. In some embodiments seat plate 23 are further loaded or biased by a positive pressure purge liquid charge in body cavity 35 when in operation. In some embodiments the purge liquid is taken from downstream where the fluid is pressurized as part of the refining process. In some embodiments a non-pressurized slurry fluid may be taken and pressurized by hydraulic pumps and other known equipment force purge liquid into the chamber 175 to augment the bellow's force and improve the seal between the seat plate 23 and the gate 11. In some embodiments floating seat plate 23 extends 197 beyond the seat 23. In some embodiments floating seat plate 23 is configured to maintain constant contact with the gate such that all process fluid is isolated from the seat 23 and prevented from entering the valve body.

In some embodiments the valve may comprise a sealing system 155 which seals the valve. In some embodiments the sealing system 155 comprises a purge liquid chamber 175. In some embodiments the sealing system 155 further comprises packing 180 configured to improve the seal between the seat plate 23 and the seat 23. In some embodiments the sealing system 155 comprises the dual dynamic live-loaded floating seating plates which provide bi-directional sealing that seals equally with high pressure from either flange end of the opening 20.

Some embodiments comprise ports 185, 187 which provides fluid communication between the valve body 35 and the purge liquid chamber 175. In some embodiments purge liquid passes from the valve body 35 through one or both ports 185 or 187 and into the purge liquid chamber 175 to bias the floating seat plate 23 against the gate 11 and seat 23. Some embodiments comprise ports 185, 187 formed in the seat 23 at the interface 190 between the seat 23 and the seat plate 23 and a conical seat plate 23 comprising an angled shelf 195 which is configured to create a radial force into the seat 23 when the seat plate 23 is biased against the seat 23. In some embodiments the port 187 further comprises packing 180 configured to improve the seal between the seat 23 and the seat plate 23. In some embodiments packing 180 comprises graphite, fiber glass, SPECTRA® fibers or carbon nanofibers, carbon nanotubes, extruded nanotubes or another appropriate material.

In some embodiments isolation valve 14 is configured to isolate at least one port 185 on a seat plate 23 from a valve opening 20 comprises a gate having a first side 12 and a second side 13; a seat 23 further comprising: an opening 20; a receiving portion 200 configured to receive a gate, the gate configured to be selectively inserted into the receiving portion 200 intermediate the seat 23; at least one port 185 formed in the seat 23; a conical seat plate 23 nested concentrically against the seat 23 and between the seat 23 and the opening 20 wherein the seat plate 23 is configured to isolate at least one port 185 formed in the seat 23 from the opening 20 wherein the seat plate 23 if further configured to articulate independent of the seat 23; and a bias system 160 configured to bias the seat plate 23 against the seat 23 to isolate the seat 23 from the opening 20. In some embodiments the isolation valve 14 further comprises packing 180 placed at the interface 190 between the conical seat plate 23 and the seat 23 which packing member 180 deforms as it is compressed radially as the seat plate 23 is biased against the seat 23. In some embodiments the conical seat plate 23 comprises a shelf 195 with an angled surface which interface 190s with the seat 23 and is configured to radially compress the packing 180 as the bias system 160 is activated. In some embodiments the isolation valve 14 bias system 160 comprises a spring 165, a bellows 170 and a purge liquid chamber 175 configured to cooperatively work to expand the purge liquid chamber 175 and bias the seat plate 23 and seat 23 against the gate 11 when purge liquid volume of the purge liquid chamber 175 is increased.

Some embodiments teach a method of isolating a purge liquid port from the valve opening 20 comprising: providing a gate having a first side 12 and a second side 13; providing a seat 23 comprising an opening 20; a receiving portion 200 configured to receive a gate, the gate configured to be selectively inserted into the receiving portion 200 intermediate the seat 23; at least one port 185 formed in the seat 23; a conical seat plate 23 nested concentrically against the seat 23 and between the seat 23 and the opening 20 wherein the seat plate 23 is configured to isolate at least one port 185 formed in the seat 23 from the opening 20 wherein the seat plate 23 if further configured to articulate independent of the seat 23; biasing the seat plate 23 against the seat 23 using a bias system 160; and compressing a packing member 180 placed at the interface 190 between the conical seat plate 23 and the seat 23 to substantially isolate the at least one port 185 from the opening 20.

In some embodiments the method further comprises providing an angled shelf 195 on the seat plate 23 which shelf 195 interface 190s with the seat 23 to radially compress the seat 23 as the seat plate 23 is biased against the seat 23. In some embodiments the method further comprises providing packing 180 at the shelf 195—seat 23 interface 190 wherein the packing 180 is configured to be compressed radially upon activation of a bias force against the seat plate 23.

In some embodiments the method further comprises selectively biasing the seat plate 23 against the seat 23 by pressurizing the purge liquid chamber 175 with purge liquid. In some embodiments the method further comprises isolating the valve body from process fluid with a seat plate 23 which extends beyond the seat 23 so that the seat plate 23 scrapes against the seat as the gate moves. Some embodiments perform the steps to the method in a different order, delay performing steps, or eliminate steps all together.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A method of purging an isolation valve comprising:

distilling an oil feedstock into different hydrocarbon fractions using a fractionation tower, the fractionation tower comprising a bottom slurry circuit;

controlling the flow of bottom slurry through the bottom slurry circuit with an isolation valve, wherein the isolation valve is purged using a liquid purge medium created in the fractionation tower.

2. The method of claim 1 wherein the liquid purge medium comprises hydrocarbons.

3. The method of claim 1 wherein the liquid purge medium comprises a light cycle oil fraction produced by the fractionation tower.

4. The method of claim 1 wherein the liquid purge medium comprises a medium cycle oil fraction produced by the fractionation tower.

5. The method of claim 1 wherein the liquid purge medium comprises a heavy cycle oil fraction produced by the fractionation tower.

6. A method for reducing cavitation in a slurry line of a fractionation system comprising:

purging an isolation valve controlling flow of a process fluid through the slurry line with a liquid purge medium derived from a fractionation tower associated with the slurry line.

7. The method of claim 1 wherein the purge medium comprises a hydrocarbon fraction produced by the fractionation tower.

8. The method of claim 6 further comprising maintaining the liquid purge medium at a pressure greater than a pressure of the process fluid flowing through the slurry line.

* * * * *